United States Patent
Seguchi et al.

(10) Patent No.: US 7,869,435 B2
(45) Date of Patent: Jan. 11, 2011

(54) COMMUNICATION CONTROL SYSTEM

(75) Inventors: Yoshiyuki Seguchi, Fukuoka (JP); Hiraku Koganemaru, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1046 days.

(21) Appl. No.: 10/570,014

(22) PCT Filed: Aug. 29, 2003

(86) PCT No.: PCT/JP03/11077
§ 371 (c)(1),
(2), (4) Date: Aug. 30, 2006

(87) PCT Pub. No.: WO2005/025149
PCT Pub. Date: Mar. 17, 2005

(65) Prior Publication Data
US 2007/0165559 A1 Jul. 19, 2007

(51) Int. Cl.
H04L 12/28 (2006.01)
(52) U.S. Cl. .................... 370/392; 709/227
(58) Field of Classification Search ............ 709/245, 709/206, 207, 227; 455/445, 455.1, 415, 455/414.3, 414.1; 370/913, 328, 338, 389, 370/392
See application file for complete search history.

(56) References Cited

U.S. PATENT DOCUMENTS 6,654,359 B1 * 11/2003 La Porta et al. ............ 370/328
6,957,262 B2 * 10/2005 Kimura et al. .............. 709/227
7,068,635 B2 * 6/2006 Dempo ....................... 370/338
2004/0098507 A1 * 5/2004 Thubert et al. ............. 709/245
2004/0242233 A1 * 12/2004 Lutgen ....................... 455/445

FOREIGN PATENT DOCUMENTS

| JP | 64-20738 A | 1/1989 |
|---|---|---|
| JP | 10-191434 A | 7/1998 |
| JP | 11-252661 A | 9/1999 |
| JP | 2001-168906 | 6/2001 |
| JP | 2002-271369 A | 9/2002 |
| JP | 2002-344479 | 11/2002 |

* cited by examiner

Primary Examiner—Man Phan
Assistant Examiner—Wei Zhao
(74) Attorney, Agent, or Firm—Fujitsu Patent Center

(57) ABSTRACT

A communication control system comprising a plurality of user terminals connected via a network composed of a plurality of sub networks; and a home agent managing the addresses of the plurality of user terminals. The home agent stores the care-of addresses of the plurality of user terminals, which are associated with one home address, in a user data storage unit. When update information including a care-of address is received from the predetermined user terminal, the home agent finds a sub network to which the predetermined user terminal is connected based on the update information, references the user data storage unit to determine the care-off address of an appropriate user terminal that is one of user terminals connected to the sub network, and transfers information, which is sent to the home address, to the determined care-of address.

8 Claims, 15 Drawing Sheets

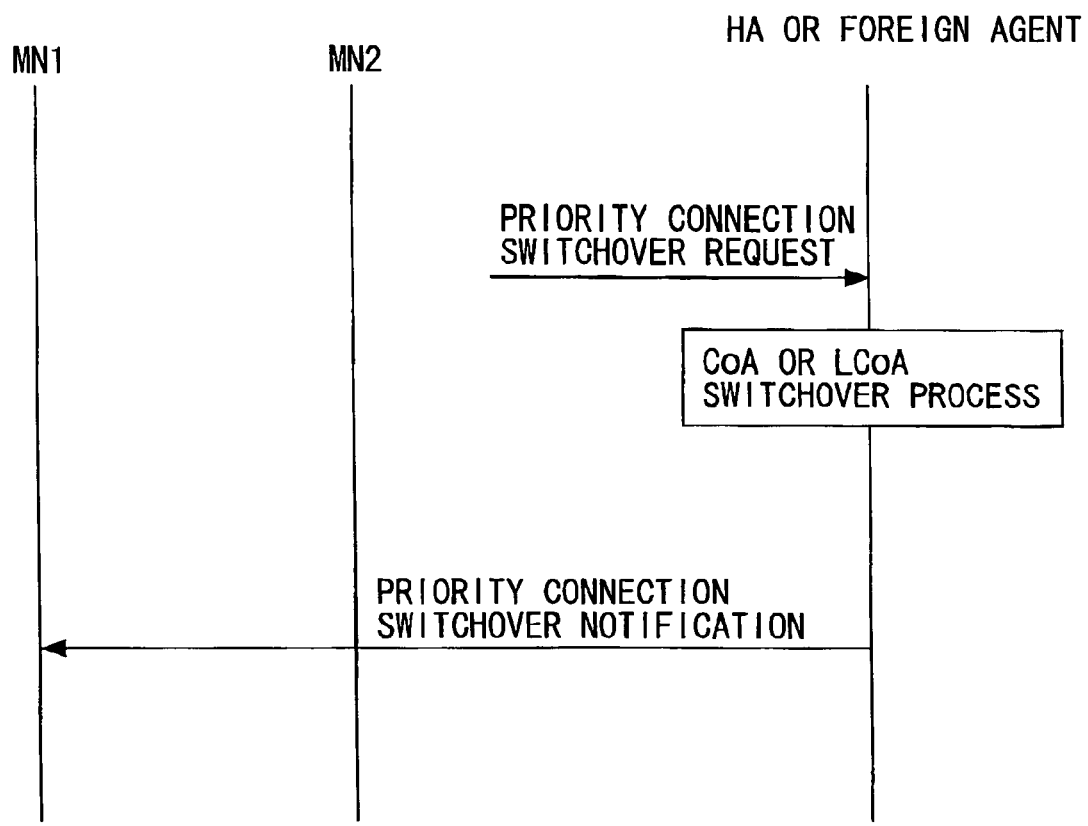

FIG. 9

| MN HOMEPAGE (HoA) |
|---|
| TRANSFER DESTINATION CoA |
| VALID PERIOD |

FIG. 10

| HOME-OF-ADDRESS | CARE-OF-ADDRESS | INTERFACE ID | STATUS | VALID PERIOD | TERMINAL CATEGORY | PRIORITY LEVEL | NW QUALITY | SERVICE LIST | LOCATION INFORMATION |
|---|---|---|---|---|---|---|---|---|---|
| HoA | CoA20-1 | 202:2dff:fe04:8ccc | ON-BOOT | 120 | PDA | 3 | 4 | * | Area-20 |
|  | CoA20-2 | 260:97ff:fede:2793 | ON-STOP | expire | IP TELEPHONE | 2 | - | * | - |
|  | CoA20-3 | 260:8ff:fe31:d45a | ON-BOOT | 240 | PC | 5 | 5 | * | Area-20 |

FIG. 11

| CN1 |
|---|
| CN2 |
| CN3 |

FIG. 12

| CORRESPONDENT NODE ADDRESS | APPLICATION CATEGORY | PROTOCOL | PORT NUMBER | SEQUENCE NUMBER | APPLICATION NAME | APPLICATION UNIQUE NFORMATION |
|---|---|---|---|---|---|---|
| CN1 | 1(rtp) | 1(rtp) | 5060 | 34 | SIP Client | * |
| CN2 | 2(Stream) | 2(rtsp) | 554 | 28 | Quick Time | * |

FIG. 15

| RCoA | CARE-OF-ADDRESS | INTERFACE ID | STATUS | VALID PERIOD | TERMINAL CATEGORY | PRIORITY LEVEL | NW QUALITY | SERVICE LIST | LOCATION INFORMATION |
|---|---|---|---|---|---|---|---|---|---|
| RCoA | LCoA1-1 | 202:2dff: fe04:8ccc | ON-BOOT | 120 | PDA | 3 | 4 | * | Area-1 |
|  | LCoA1-2 | 260:97ff: fede:2793 | ON-STOP | expire | IP TELEPHONE | 2 | – | * | – |
|  | LCoA1-3 | 260:8ff: fe31:d45a | ON-BOOT | 240 | PC | 5 | 5 | * | Area-1 |

FIG. 16

| RCoA |
|---|
| TRANSFER DESTINATION LCoA |
| VALID PERIOD |

COMMUNICATION CONTROL SYSTEM

CROSS REFERENCE TO RELATED APPLICATION

The present application is a U.S. National Phase application of PCT International Application No. PCT/JP2003/011077 filed on Aug. 29, 2003, now pending, the content of which is herein incorporated by reference.

BACKGROUND OF THE INVENTION

The present invention relates to a communication control system. The present invention is applied, for example, in a mobile IP network environment configured by nodes each implementing a mobile IP (Internet Protocol), to a home agent (HA) or to a foreign agent managing a terminal-moved network of a mobile terminal (MN (Mobile Node)) and to the mobile terminal employed by a user.

Over the recent years, a research of the mobile IP defined as a technology for enabling the mobile terminal to perform continuous (seamless) IP communications without depending on its location, has been advanced.

The mobile IP has already been standardized in IPv4 (Internet Protocol version 4), wherein a great number of network products such as clients, routers and servers each implementing a mobile IP function have appeared. An active discussion is conducted at the present in the Standardization Organization such as IETF (Internet Engineering Task Force), aiming at actualizing an IPv6-based mobile IP.

The mobile IP actualizes terminal mobility by employing a layer-3 IP technology. To be specific, a home agent administering the mobile terminal manages a home-of-address (HoA) set in each mobile terminal in a network (home network) to which the home agent belongs and a care-of-address (CoA) set in a network (subnetwork) to which the mobile terminal moves, whereby continuity of the communications (seamless communications) is actualized by forwarding a transmission packet addressed to the home-of-address HoA of the mobile terminal to the care-of-address CoA.

For instance, in FIG. 17 showing a view of a system architecture of the prior art, an assumption is that a mobile terminal 100 (FIG. 19) administered by a home agent 200 (FIG. 18) in a home network 10, when getting located in a foreign network 30 connected via a wireless LAN, starts communications with a correspondent node (CN) 300, and thereafter moves to a foreign network 20. The following is a communication procedure to be made at that time.

(1) The correspondent node 300 starts performing the communications with the home-of-address HoA of the mobile terminal 100.

(2) A packet addressed to the home-of-address HoA is routed to the home network 10.

(3) The home agent 200 acting as a surrogate, the mobile terminal 100 not existing in the home network 10, captures the packet addressed to the home-of-address HoA, i.e., the packet addressed to the mobile terminal 100 and encapsulates the packet with a care-of-address CoA 2 defined as an address in the foreign network 30 where the mobile terminal 100 exists, thus forwarding the encapsulate packet (to the care-of-address CoA 2). With this encapsulation, the packet reaches the mobile terminal 100 in the foreign network 30.

(4) Next, the mobile terminal 100, when moving to the foreign network 20, sends a registration request to the home agent 200.

(5) The home agent 200 receiving the registration request changes the care-of-address CoA 2 associated with the home-of-address HoA to a care-of-address CoA 1. Thereafter, the packet from the correspondent node 300 is forwarded to the care-of-address CoA 1 in the foreign network 20. With this scheme, the packet reaches the mobile terminal 100 in the foreign network 20.

As described above, the mobile IP enables the continuous communications (seamless communications) even when the IP address is changed after the mobile terminal has moved to a (different) network. It should be noted that there must be redundant communication routes between the mobile terminal and the correspondent node always via the home agent when the mobile terminal exists in its moving destination, and hence route optimization is carried out in the great majority of cases. After carrying out the route optimization, the correspondent node transmits the packet not to the home-of-address HoA but directly to the care-of-address CoA. With this direct transmission, the communications can be performed via the optimized route between the mobile terminal and the correspondent node without via the home agent.

Further, a variety of systems (refer to Patent documents 1 through 4) are proposed as the prior arts related to the user mobility system. For example, [User Mobility Management Method in Personal Communication System] in Patent document 1 discloses a method of managing a subscriber number and terminal numbers of plural terminals usable by the user, and, when connected to the subscriber number, establishing a connection to an optimal terminal.

Patent Document 1
Japanese Patent Application Laid-Open Publication No. 10-191434
Patent Document 2
Japanese Patent Application Laid-Open Publication No. 2002-271369
Patent Document 3
Japanese Patent Application Laid-Open Publication No. 2002-344479
Patent Document 4
Japanese Patent Application Laid-Open Publication No. 2001-168906

SUMMARY OF THE INVENTION

Looking at the communication environments surrounding the users in recent years, there exists a plurality of terminals possessed by the user. Further, it is not rare that each terminal is connectable to the network, and there is a demand for desiring to enjoy continuous services while being kept connecting to the network at all times without depending on the terminal in use (even when changing the terminal).

Moreover, as viewed from a standpoint of the user, it is desirable that the communications can be performed by employing an always-optimal terminal to the user in the plurality of usable terminals.

Under such circumstances, the prior arts have the following problems.

(1) The mobile IP actualizes the terminal mobility on a terminal-by-terminal basis but is unable to provide the user with continuously enjoying the seamless services while being kept in communication linkage between the plural terminals. For instance, in the case of desiring to continuously watch a streaming content being watched on a PDA (Personal Digital Assistant) on a PC (Personal Computer), the communication with the PDA must be temporarily disconnected and again connected to the PC. Further, [User Mobility Management Method in Personal Communication System] in Patent document 1 enables the connection to the optimal terminal from within the plurality of terminals owned by the user, however, the following problems arise.

(2) It is impossible to switch over the terminal while maintaining a communication session established on the terminal. In a case where the terminal establishes a plurality of communication sessions as in the IP network, it is importance of enabling the sessions to be maintained.

(3) In the mobile IP network, the communication route between the mobile terminal and the correspondent node is optimized, and, because of not always flowing via the home agent, the terminal switchover can not be controlled by the method in Patent document 1.

Such being the case, it is an object of the present invention to enable the communications to be continued by use of an proper user terminal even when a user moves across different subnetworks by forwarding, in a case where a predetermined user terminal connects to a terminal-moved subnetwork as the user moves, information from a correspondent node to the proper user terminal in the user terminals connected to this subnetwork.

The present invention adopts the following means in order to solve the problems given above.

A communication control system according to the present invention comprises a plurality of user terminals connected via a network built up by a plurality of subnetworks, and a home agent managing addresses of the user terminals, at least one of the plural user terminals being set as a predetermined user terminal connecting, as a user moves, to the subnetwork to which the user terminal moves, the predetermined user terminal comprising: an address acquisition module acquiring a care-of-address when the predetermined user terminal connects to the subnetwork; and an address control module sending update information containing the care-of-address to the home agent, the home agent comprising:

a user data storage module stored with the care-of-addresses of the plurality of user terminals in a way that associates the care-of-addresses with one single home-of-address;

a care-of-address determination module obtaining, when receiving the update information from the predetermined user terminal, the subnetwork to which the predetermined user terminal connects on the basis of the update information, and acquiring the care-of-address of a proper user terminal in the user terminals connecting to the subnetwork by referring to the user data storage module; and a communication control module transferring the information transmitted to the home-of-address to the care-of-address determined by the care-of-address determination module.

Further, a communication control system according to the present invention comprises a plurality of user terminals connected via a network built up by a plurality of subnetworks including at least some hierarchized subnetworks, a foreign agent managing addresses of the plurality of user terminals connected to the hierarchized subnetworks, and a home agent managing the addresses of the plurality of user terminals and an address of the foreign agent, at least one of the plural user terminals being set as a predetermined user terminal connecting, as a user moves, to the subnetwork to which the user terminal moves, the predetermined user terminal comprising:

an address acquisition module acquiring a care-of-address when the predetermined user terminal connects to the subnetwork; and an address control module sending update information containing the care-of-address to the foreign agent, the foreign agent comprising:

a user data storage module stored with the care-of-addresses of the plurality of user terminals in a way that associates the care-of-addresses with one single regional address;

a care-of-address determination module obtaining, when receiving the update information from the predetermined user terminal, the subnetwork to which the predetermined user terminal connects on the basis of the update information, and acquiring the care-of-address of a proper user terminal in the user terminals connecting to the subnetwork by referring to the user data storage module;

a communication control module transferring the information transmitted to the regional address to the care-of-address determined by the care-of-address determination module;

an address control module transmitting the update information containing the regional address to the home agent, the home agent comprising: a user data storage module stored with the regional address in a way that associates the regional address with a home-of-address; and a communication control module forwarding the information transmitted to the home-of-address to the regional address by referring to the user data storage module.

In the communication control system, the home agent may include a priority level storage module stored with priority level information of the user terminals, and the care-of-address determination module may obtain, when receiving the update information from the predetermined user terminal, the subnetwork to which the predetermined user terminal connects on the basis of the update information, and may acquire the care-of-address of the user terminal exhibiting a high priority level as a proper user terminal in the user terminals connected to the subnetworks by referring to the priority level storage module and the user data storage module.

In the communication control system, the home agent may include a switchover control module switching over the care-of-address associated with the home-of-address when receiving a switchover request from the user terminal, and the communication control module may forward the information addressed to the home-of-address to a post-switchover care-of-address.

In the communication control system, the home agent may include a user data management module notifying, when changing the care-of-address associated with the home-of-address, the user terminal having a pre-switchover care-of-address, of a purport that the care-of-address of the connection destination has been switched over.

In the communication control system, the foreign agent may include a priority level storage module stored with priority level information of the user terminals, the care-of-address determination module may obtain, when receiving the update information from the predetermined user terminal, the subnetwork to which the predetermined user terminal connects on the basis of the update information, and may acquire the care-of-address of the user terminal exhibiting a high priority level as a proper user terminal in the user terminals connected to the subnetworks by referring to the priority level storage module and the user data storage module.

In the communication control system, the foreign agent may include a switchover control module switching over the care-of-address associated with the home-of-address when receiving a switchover request from the user terminal, and the communication control module may forward the information addressed to the home-of-address to a post-switchover care-of-address.

In the communication control system, the foreign agent may include a user data management module notifying, when changing the care-of-address associated with the home-of-address, the user terminal having a pre-switchover care-of-address, of a purport that the care-of-address of the connection destination has been switched over.

In the communication control system, the user terminal may include a communication destination information transfer module transferring, when receiving the switchover information, the communication destination information to a terminal becoming a new connection destination.

In the communication control system, the user terminal receiving the communication destination information may include an address change notification module sending a connection destination address change notification to a correspondent node on the basis of the communication destination information.

In the communication control system, the user terminal receiving the communication destination information may include a communication destination information management module taking over a session carried out between the correspondent node and the pre-change user terminal on the basis of the communication destination information, and carrying out the session with the correspondent node.

Still further, a home agent according to the present invention is connected to a plurality of user terminals via a network built up by a plurality of subnetworks, at least one of the plural user terminals being set as a predetermined user terminal connecting, as a user moves, to the subnetwork to which the user terminal moves, the home agent comprising:

an update information receiving module receiving, from the predetermined user terminal, update information containing a care-of-address when the predetermined user terminal connects to the subnetwork;

a user data storage module stored with the care-of-addresses of the plurality of user terminals in a way that associates the care-of-addresses with one single home-of-address;

a care-of-address determination module obtaining, when receiving the update information from the predetermined user terminal, the subnetwork to which the predetermined user terminal connects on the basis of the update information, and acquiring the care-of-address of a proper user terminal in the user terminals connecting to the subnetwork by referring to the user data storage module; and a communication control module transferring the information transmitted to the home-of-address to the care-of-address determined by the care-of-address determination module.

In the home agent, this home agent may include a priority level storage module stored with priority level information of the user terminals, and the care-of-address determination module may obtain, when receiving the update information from the predetermined user terminal, the subnetwork to which the predetermined user terminal connects on the basis of the update information, and may acquire the care-of-address of the user terminal exhibiting a high priority level as a proper user terminal in the user terminals connected to the subnetworks by referring to the priority level storage module and the user data storage module.

In the home agent, this home agent may include a switchover control module switching over the care-of-address associated with the home-of-address when receiving a switchover request from the user terminal, and the communication control module may forward the information addressed to the home-of-address to a post-switchover care-of-address.

In the home agent, this home agent may include a user data management module notifying, when changing the care-of-address associated with the home-of-address, the user terminal having a pre-switchover care-of-address, of a purport that the care-of-address of the connection destination has been switched over.

Yet further, a foreign agent according to the present invention is connected to a plurality of user terminals and a home agent via a network built up by a plurality of subnetworks of which at least some subnetworks are hierarchized, at least one of the plural user terminals being set as a predetermined user terminal connecting, as a user moves, to the subnetwork to which the user terminal moves, the foreign agent comprising:

an update information receiving module receiving, from the predetermined user terminal, update information containing a care-of-address when the predetermined user terminal connects to the subnetwork;

a user data storage module stored with the care-of-addresses of the plurality of user terminals in a way that associates the care-of-addresses with one single regional address;

a care-of-address determination module obtaining, when receiving the update information from the predetermined user terminal, the subnetwork to which the predetermined user terminal connects on the basis of the update information, and acquiring the care-of-address of a proper user terminal in the user terminals connecting to the subnetwork by referring to the user data storage module;

a communication control module transferring the information transmitted to the regional address to the care-of-address determined by the care-of-address determination module; and an address control module transmitting the update information containing the regional address to the home agent.

In the foreign agent, this foreign agent may include a priority level storage module stored with priority level information of the user terminals, and the care-of-address determination module may obtain, when receiving the update information from the predetermined user terminal, the subnetwork to which the predetermined user terminal connects on the basis of the update information, and acquires the care-of-address of the user terminal exhibiting a high priority level as a proper user terminal in the user terminals connected to the subnetworks by referring to the priority level storage module and the user data storage module.

In the foreign agent, this foreign agent may include a switchover control module switching over the care-of-address associated with the home-of-address when receiving a switchover request from the user terminal, and the communication control module may forward the information addressed to the home-of-address to a post-switchover care-of-address.

In the foreign agent, this foreign agent may include a user data management module notifying, when changing the care-of-address associated with the home-of-address, the user terminal having a pre-switchover care-of-address, of a purport that the care-of-address of the connection destination has been switched over.

Moreover, a communication control method according to the present invention is executed in a communication control system comprising a plurality of user terminals connected via a network built up by a plurality of subnetworks, and a home agent managing addresses of the user terminals, at least one of the plural user terminals being set as a predetermined user terminal connecting, as a user moves, to the subnetwork to which the user terminal moves, the predetermined user terminal executing:

a step of acquiring a care-of-address when the predetermined user terminal connects to the subnetwork; and a step of sending update information containing the care-of-address to a home network, the home agent executing:

a step of obtaining, when receiving the update information from the predetermined user terminal, the subnetwork to which the predetermined user terminal connects on the basis of the update information;

a step of acquiring the care-of-address of a proper user terminal in the user terminals connecting to the subnetwork by referring to a user data storage module stored with care-of-addresses of the plurality of user terminals in a way that associates the care-of-addresses with one home-of-address; and a step of transferring the information transmitted to the home-of-address to the care-of-address acquired in the care-of-address acquiring step.

Still moreover, a communication control method according to the present invention is executed in a communication control system comprising a plurality of user terminals connected via a network built up by a plurality of subnetworks including at least some hierarchized subnetworks, a foreign agent managing addresses of the plurality of user terminals connected to the hierarchized subnetworks, and a home agent managing the addresses of the plurality of user terminals and an address of the foreign agent, at least one of the plural user terminals being set as a predetermined user terminal connecting, as a user moves, to the subnetwork to which the user terminal moves, the predetermined user terminal executing:

a step of acquiring a care-of-address when the predetermined user terminal connects to the subnetwork; and a step of sending update information containing the care-of-address to the foreign agent, the foreign agent executing:

a step of obtaining, when receiving the update information from the predetermined user terminal, the subnetwork to which the predetermined user terminal connects on the basis of the update information;

a step of acquiring the care-of-address of a proper user terminal in the user terminals connecting to the subnetwork by referring to a user data storage module stored with the care-of-addresses of the plurality of user terminals in a way that associates the care-of-addresses with one single regional address; a step of transferring the information transmitted to the regional address to the care-of-address determined in the care-of-address acquiring step;

a step of transmitting the update information containing the regional address to the home agent, the home agent executing:

a step of forwarding the information transmitted to the home-of-address to the regional address by referring to the user data storage module stored with the regional address in a way that associates the regional address with a home-of-address. Yet moreover, a communication control program according to the present invention is executed by a home agent connected to a plurality of user terminals via a network built up by a plurality of subnetworks, at least one of the plural user terminals being set as a predetermined user terminal connecting, as a user moves, to the subnetwork to which the user terminal moves, the program comprising:

a step of receiving, from the predetermined user terminal, update information containing a care-of-address when the predetermined user terminal connects to the subnetwork;

a step of obtaining, when receiving the update information from the predetermined user terminal, the subnetwork to which the predetermined user terminal connects on the basis of the update information, a step of acquiring the care-of-address of a proper user terminal in the user terminals connecting to the subnetwork by referring to a user data storage module stored with the care-of-addresses of the plurality of user terminals in a way that associates the care-of-addresses with one single home-of-address; and a step of transferring the information transmitted to the home-of-address to the care-of-address determined in the care-of-address acquiring step.

Additionally, a communication control program according to the present invention is executed by a foreign agent connected to a plurality of user terminals and a home agent via a network built up by a plurality of subnetworks of which at least some subnetworks are hierarchized, at least one of the plural user terminals being set as a predetermined user terminal connecting, as a user moves, to the subnetwork to which the user terminal moves, the program comprising:

a step of receiving, from the predetermined user terminal, update information containing a care-of-address when the predetermined user terminal connects to the subnetwork;

a step of obtaining, when receiving the update information from the predetermined user terminal, the subnetwork to which the predetermined user terminal connects on the basis of the update information, a step of acquiring the care-of-address of a proper user terminal in the user terminals connecting to the subnetwork by referring to a user data storage module stored with the care-of-addresses of the plurality of user terminals in a way that associates the care-of-addresses with one single regional address; a step of transferring the information transmitted to the regional address to the care-of-address determined in the care-of-address acquiring step; and a step of transmitting the update information containing the regional address to the home agent.

Furthermore, the present invention may also be a readable-by-computer storage medium stored with the program. The program on this storage medium is read and executed, whereby functions thereof can be provided.

Herein, the readable-by-computer storage medium storage medium connotes a storage medium capable of storing information such as data, programs, etc. electrically, magnetically, optically, mechanically or by chemical action, which can be read from the computer and so on. Among these storage mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the storage mediums fixed within the computer.

BRIEF DESCRIPTION OF THE DRAWINGS

FIG. 8 is a diagram showing a processing sequence in the case of explicitly switching over a terminal used for communications;

FIG. 9 is an explanatory diagram of MN information management data;

FIG. 10 is an explanatory diagram of user terminal information management data;

FIG. 11 is an explanatory diagram of communication destination information data;

FIG. 12 is an explanatory diagram of session information;

FIG. 15 is an explanatory diagram of MN (user terminal) information management data of a foreign agent;

FIG. 16 is an explanatory diagram of MN (user terminal) information management data of a foreign agent;

DETAILED DESCRIPTION OF THE PREFERRED EMBODIMENT

Embodiments of the present invention will hereinafter be described with reference to the accompanying drawings. It should be noted that the following embodiments exemplify a PC, a fixed telephone, a PDA, etc as a user terminal, however, the present invention does not limit the terminal and access means (a wireless LAN and a fixed network), and a system can be configured by use of an IP-connectable arbitrary terminal and network access means. In addition, the following description is about an example of a mobile IPv6 technology based on IPv6 (Internet Protocol version 6), however, the present invention can be applied to a mobile IPv4 technology based on IPv4 (Internet Protocol version 4).

First Embodiment

§1. Whole Architecture

Figure 1:
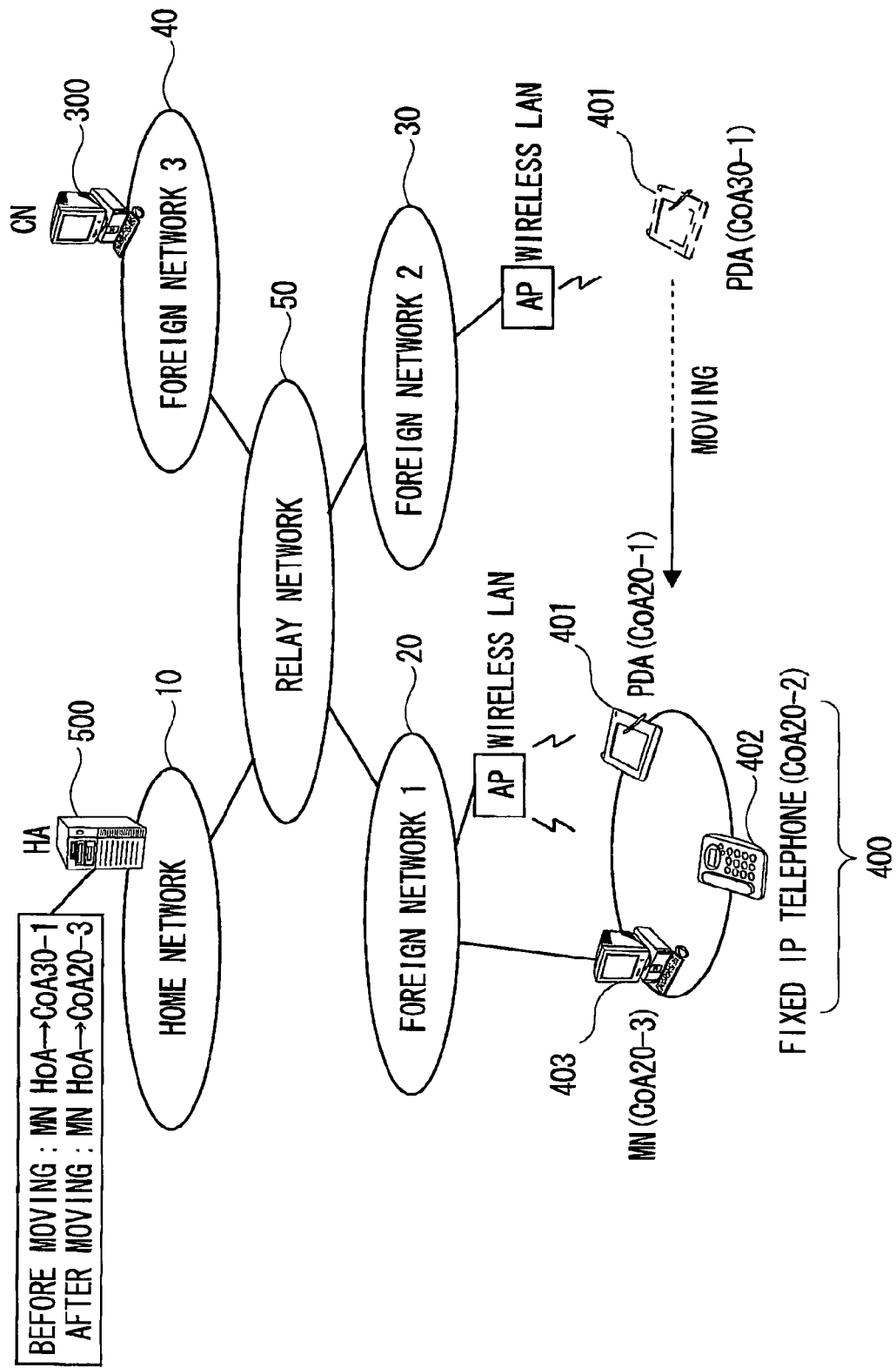
FIG. 1 is a view showing a system architecture in a first embodiment according to the present invention.

FIG. 1 is a view showing a system architecture in a first embodiment. The first embodiment exemplifies an example, wherein plural user terminals 400 are connected to a home agent 500 via a network built by subnetworks such as a home network 10 and foreign networks 20, 30, 40, and a relay network 50 that relays these subnetworks.

A scheme in the first embodiment is that when a user starts communications by use of any one of terminals 401 through 403 among the plurality of user terminals 400 and moves during the communications, the communications can continue (seamless communications) by switchover to another terminal among the user terminals 401 through 403 existing in a subnetwork to which the user moves (visits).

For example, when the user performs the communications with a correspondent node 300 by a PDA 401 via the foreign network 30 in a place where the user goes out, and moves to the office during the communications, wherein the PDA 401 is connected to the foreign network 20. In this case, the communications continue by the switchover to a terminal (desktop PC) 403 exhibiting a highest priority level among the user terminals 401-403 connected to the foreign network 20.

§2. Explanations of Respective Components

[User Terminal]

Figure 2:
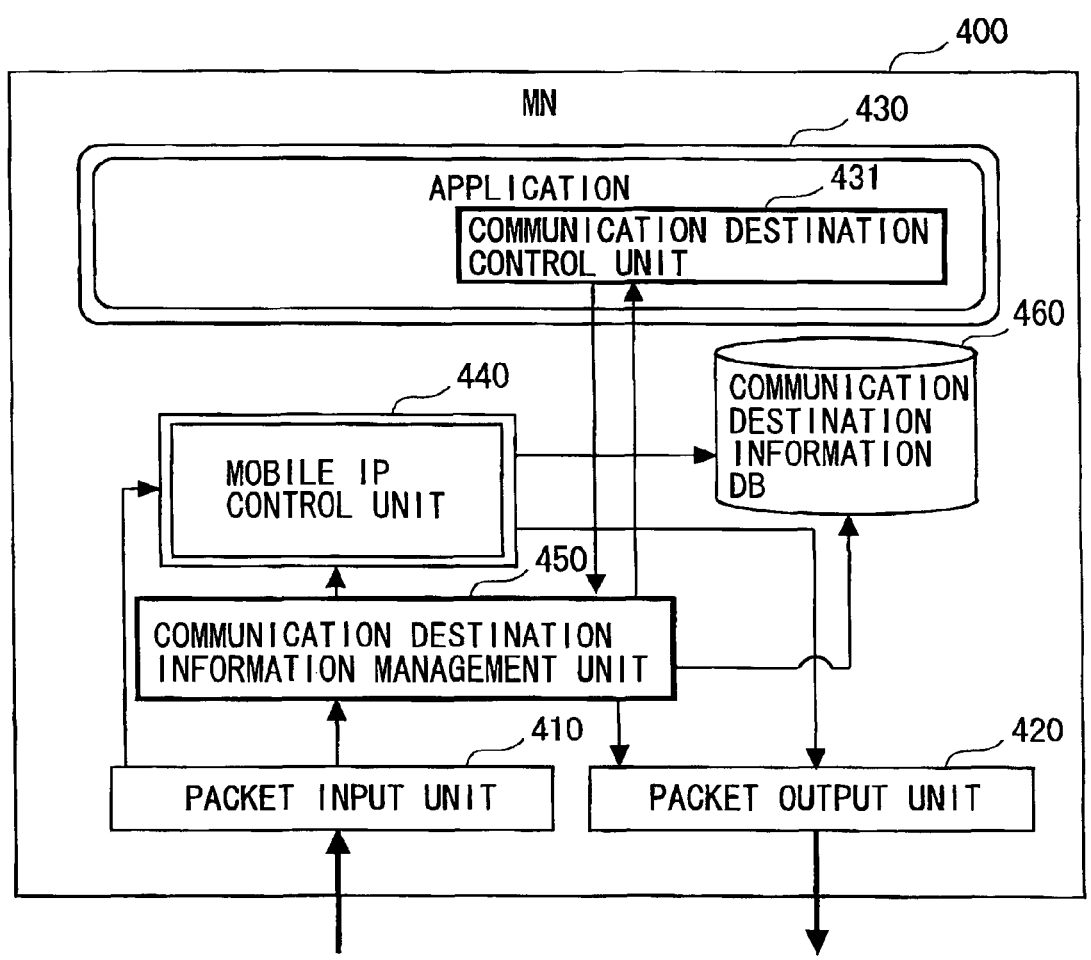
FIG. 2 is a schematic block diagram of a user terminal 400.

FIG. 2 is a schematic block diagram of the user terminal 400. The user terminal 400 is a general type of computer constructed of an arithmetic processing unit composed of a CPU and a main memory, a storage device stored with software used for executing processes by the arithmetic processing unit and with an arithmetic result, a communication control unit for performing the communications with other nodes, and so on. The computer serving as the user terminal is made to execute a predetermined program, thereby actualizing, as shown in FIG. 2, functions as a packet input unit (module) 410, a packet output unit (module) 420, an application execution unit (module) 430, a communication destination control unit (module) 431, a mobile IP control unit (module) 440 and a communication destination information management unit (module) 450.

1) The packet input unit 410 executes an input process of inputting, to the communication destination information management unit 450 and the mobile IP control unit 440, information (the information of the communications with the correspondent node is packetized and thus transmitted, and is therefore simply termed a packet in the embodiment). For example, if the received packet is a priority-based connection destination switchover notification from a home agent 500 or a communication destination information notification on an old user terminal, the communication destination information management unit 450 is notified of a message.

2) The packet output unit 420 transmits (forwards), on to the network via the communication control unit, the packet generated by the communication destination information management unit 450 and by the mobile IP control unit 440 and addressed to the correspondent node.

3) An application execution unit (module) 430 is actualized by client software such as streaming (application software) and SIP (Session Initiation Protocol), and thus performs the communications with other nodes.

4) The communication destination control unit 431 notifies the communication destination information management unit 450 of communication session information, corresponding to a status of the communications with other modes by the application execution unit.

5) The mobile IP control unit (corresponding to an address acquisition module, an address control module and an address change notifying module) 440 conducts mobile IP based control and manages the communication destination information (Binding Cache (BC) stored with binding of HoA and CoA). For instance, when the user terminal 400 connects to the subnetwork, the mobile IP control unit 440 acquires a care-of-address CoA via a router from the host computer administering the subnetwork in accordance with a protocol for the subnetwork. Further, when the care-of-address CoA changes, this implies that the user terminal 400 moves from the subnetwork to the subnetwork, and the mobile IP control unit 440 sends update information (BU transmission: Binding Update transmission) containing the care-of-address to the home agent 500. When the terminal 400 performing the communications is switched over as triggered by the movement of the user terminal, the mobile IP control unit 440 notifies the correspondent node of the change of the connection destination address (BU transmission Binding Update transmission) in accordance with an instruction given from the communication destination information management unit 450.

6) The communication destination information management unit (including a communication destination transfer module) 450, when receiving the priority-based connection switchover notification from the home agent 500, transmits self-node communication destination information (FIG. 11) to a new priority-based connection MN (the user terminal) serving as a new connection destination. Further, when receiving the communication destination information from an old priority-based communication MN (the user terminal) and when performing the communications without through the home agent 500 (when optimizing a communication route), the communication destination information management unit 450 notifies the mobile IP control unit 440 of a change of CoA (BU transmission) with respect to the correspondent node. Further, the communication destination information management unit 450 notifies the communication destination control unit 431 of a session restoring request on the basis of communication session information (FIG. 12) added to the communication destination information, and takes over the session, thus performing the communications with the correspondent node.

7) The communication destination information DB (a communication destination information storage module) 460 is a database built up within the storage device, and is stored with, in addition to the communication destination information (Binding Cache), new pieces of managed-by-application communication session information about the communication session with the correspondent node.

The PDA 401 in the plurality of user terminals 400 is registered as a predetermined user terminal carried by the user and moved together with the user in the home agent 500. With this registration, the home agent 500 recognizes that the user exists in a location of the subnetwork to which the PDA 401 is connected.

[Home Agent]

Figure 3:
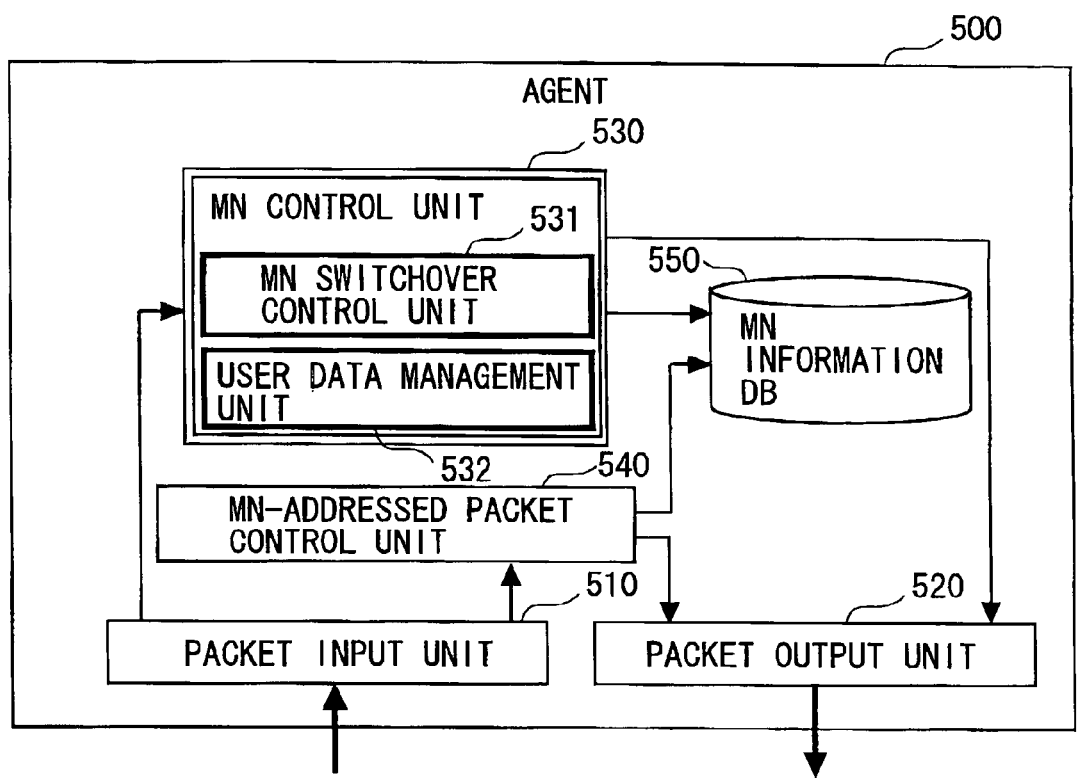
FIG. 3 is a schematic block diagram of a home agent 500.

FIG. 3 is a schematic block diagram of the home agent 500 provided in the home network 10 and managing the addresses of the plurality of user terminals.

The home agent 500 is a computer constructed of an arithmetic processing unit composed of a CPU and a main memory, a storage device, a communication control unit and so forth. The computer serving as the home agent is made to execute a predetermined program (a communication control program according to the present invention), thereby actualizing, as shown in FIG. 3, functions as a packet input unit (module) 510, a packet output unit (module) 520, a MN control unit (module) 530, a MN switchover control unit (module) 531, a user data management unit (module) 532, a MN-addressed packet control unit (module) 540 and a MN information DB 550.

8) The packet input unit 510, if the received packet is a mobile IP control message addressed to the self-node, inputs this message to the MN control unit 530 and, if the received packet is a packet addressed to the self-managed user terminal, transfers this packet to the MN-addressed packet control unit.

9) The packet output unit 520 forwards the packet onto the network.

10) The MN control unit 530 executes a process of the mobile IP control message. If the message is a priority-based connection switchover request message given from the MN or the management terminal, the MN control unit 530 transfers the message to the MN switchover control unit 531 and, if the message is a mobile IP control message, conducts protocol control and hands over the control to the user data management unit 532.

11) The MN switchover control unit 531, in order to effect the switchover of the user terminal 400 employed for the communications in response to the request given from the user, instructs the user data management unit 532 to switch over the care-of-address associated with the home-of-address (address mapping) i.e., the MN switchover control unit 531 gives a connection priority order switchover request to the user data management unit 532.

12) The user data management unit (including a care-of-address determination module) 532 manages the care-of-addresses CoA of the plurality of terminals possessed by the user, obtains the care-of-address CoA associated with the home-of-address HoA in accordance with a state of the user. Then, the user data management unit 532, when switching over the care-of-address, notifies the MN-addressed packet control unit 540 of this switchover, and notifies the user terminal 400 having a before-switchover care-of-address, of switchover information purporting that the care-of-address of the connection destination has been switched over.

13) The MN-addressed packet control unit (corresponding to a communication control module) 540, if a predetermined user terminal does not exist in the self-network, captures a packet addressed to the user's home-of-address, and encapsulates the packet with the care-of-address CoA of which the user data management unit 532 has notified, thus forwarding the encapsulated packet onto the network where the user terminal 400 exists.

14) The MN information DB (corresponding to a user data storage module and a priority level storage module) 550 is defined as a database built up within the storage device and is stored with the care-of-addresses of the plurality of user terminals usable by the user in a way that associates these care-of-addresses with one home-of-address determined by each user. Further, the MN information DB 550 is stored with information for determining a transfer destination care-of-address CoA, i.e., a priority level of the user terminal on a subnetwork-by-subnetwork basis in the present example.

§3. Communication Control Method

Next, a communication control procedure (method) according to the first embodiment will hereinafter be described with reference to FIGS. 4 through 8.

Figure 4:
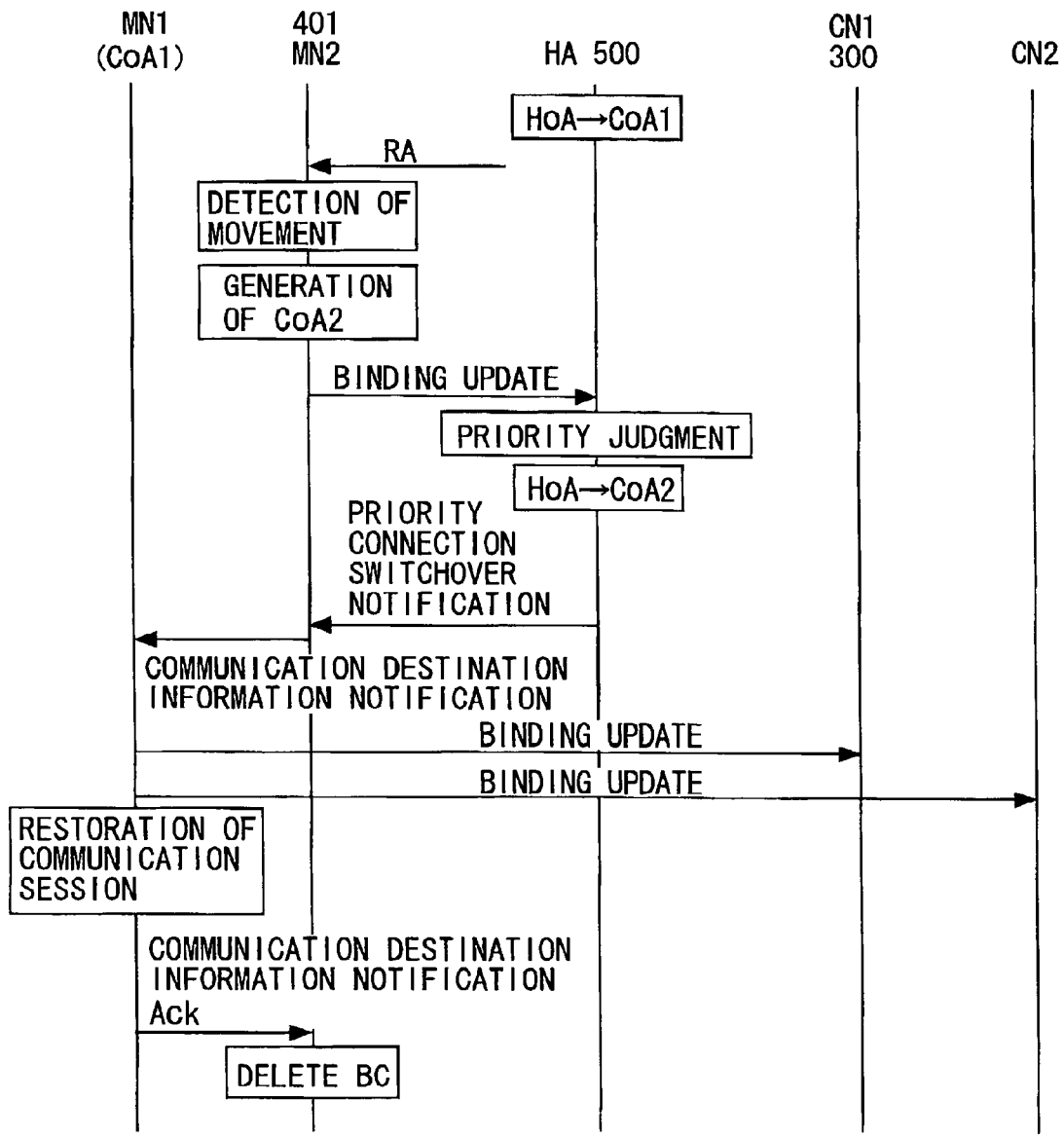
FIG. 4 is a diagram showing a processing sequence between nodes in the first embodiment.

FIG. 4 is a diagram showing a sequence between the nodes. FIG. 4 illustrates an example, wherein the PDA 401 serving as the predetermined user terminal performing the communications with the correspondent node 300 in the foreign network 30 moves to (visits) the foreign network 20 during the communications.

To start with, the PDA 401, when having moved, receives an RA (Router Advertisement) message from the foreign network 20 to which the PDA 401 has moved. The PDA 401 receiving the RA message detects the movement from a change in RA detection information, and generates a care-of-address CoA 20-2. Thereafter, the PDA 401 sends a BU message to the home agent 500.

The home agent 500 receiving the Bu message judges a connection priority order (priority level) of the user terminal 401 in the terminal-moved foreign network 20. If a terminal exhibiting a higher priority level than the user terminal 401 exists in the terminal-moved foreign network 20, the home agent 500 switches over the care-of-address associated with the home-of-address HoA. In this example, the home agent 500 effects the switchover to a care-of-address CoA 20-3 of a desktop type PC 403.

Thereafter, the home agent 500 sends, to the PDA 401 (CoA 20-1) that was an old priority-based connection MN, a priority-based connection switchover notification message showing that the priority-based connection node has been switched over to a different node.

The PDA 401 receiving the priority-based connection switchover notification message sends the communication destination information (Binding Cache) and the communication session information to the desktop type PC 403 set afresh as the priority-based connection MN. Thereafter, the PDA 401 deletes the communication destination information (Binding Cache) and the communication session information of the self-node after receiving an Ack message in response to the communication destination information notification, and finishes the communications of the application.

Further, the desktop type PC 403 set afresh as the priority-based connection MN receives the communication destination information and, in the case of optimizing the communication route, sends to the correspondent node CN a BU message notifying that the care-of-address CoA defined as the connection destination address has been changed. Moreover, the desktop type PC 403 restores the communication session based on the communication session information. Then, the desktop type PC 403 sends a communication destination information notification Ack to the PDA 401 (CoA 20-1) that was the old priority-based connection MN.

From what has been described above, when the home agent 500 manages the plurality of terminals 400 employed by the user, the terminal 400 different from the terminal 401 that has been used so far becomes usable (in the description given above, the user moves, and the PC 403 and the fixed IP telephone 402 existing in the same area become usable), which triggers the switchover of the priority-based connection MN and the transfer of the communication session information, whereby the communication session can be seamlessly switched over to the proper terminal 403 without causing any troublesome operation of the user.

Further, the BU message is sent to the correspondent node from the new priority-based connection destination node on the basis of the communication destination information of the old priority-based connection MN, and the connection destination address is changed, thereby enabling the communication session to be maintained by the new node even when the communications conducted so far are the communications after the route optimization without through the home agent.

Next, an in-depth explanation of this communication control will be given including the processes in the respective nodes.

Figure 5:
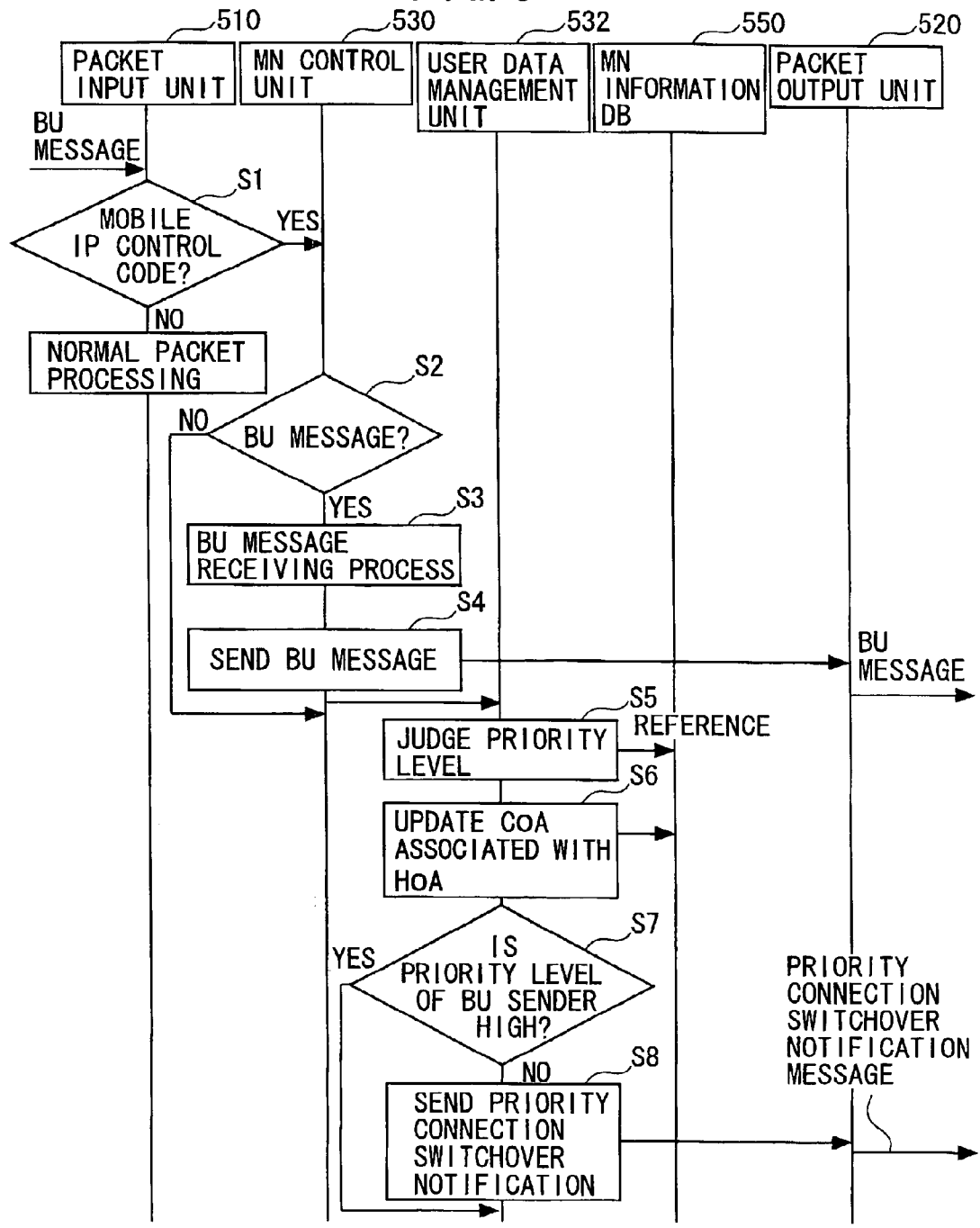
FIG. 5 is a diagram showing a priority-based connection switchover processing sequence of the home agent.
Figure 6:
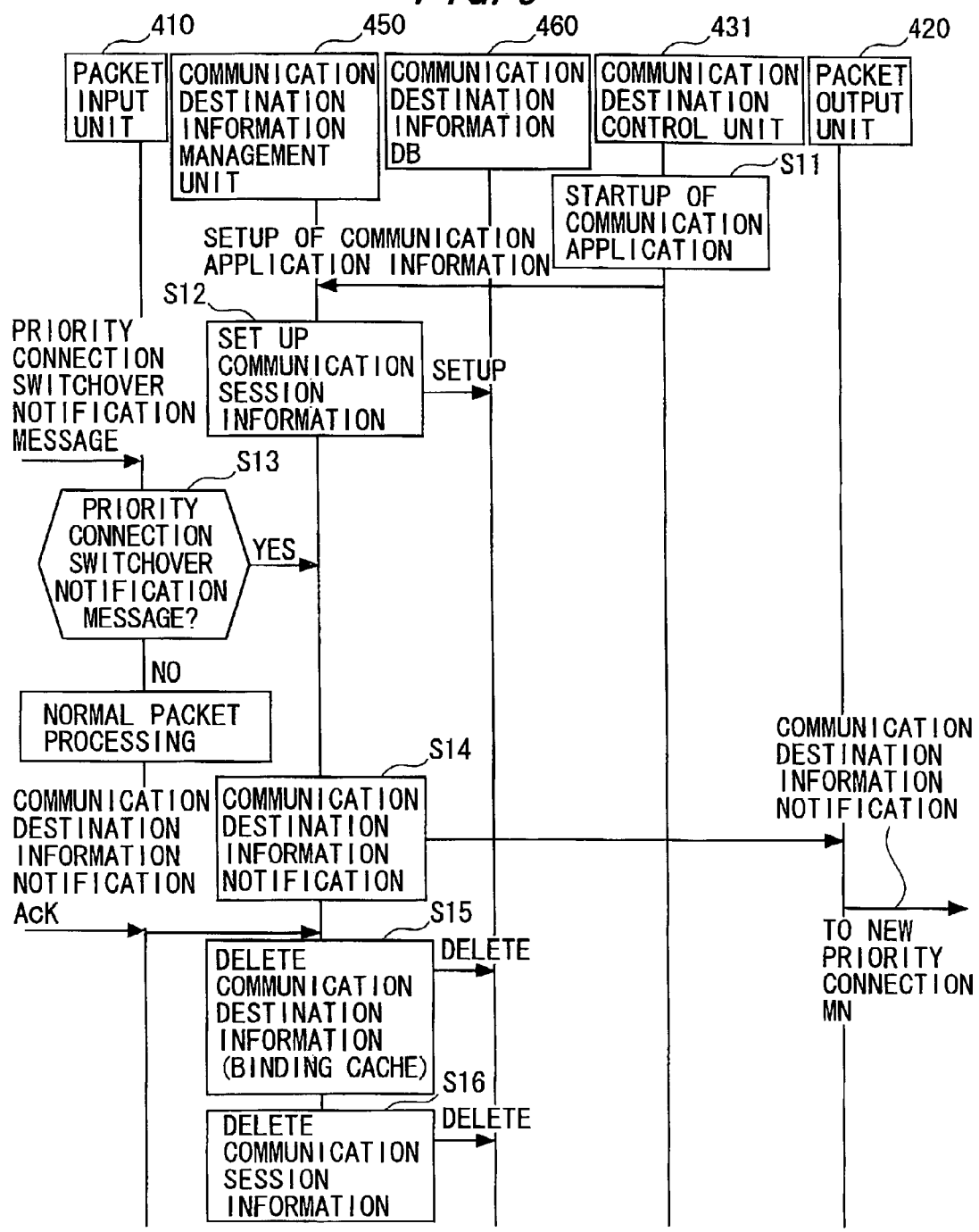
FIG. 6 is a diagram showing a processing sequence of receiving a priority-based connection switchover notification message.
Figure 7:
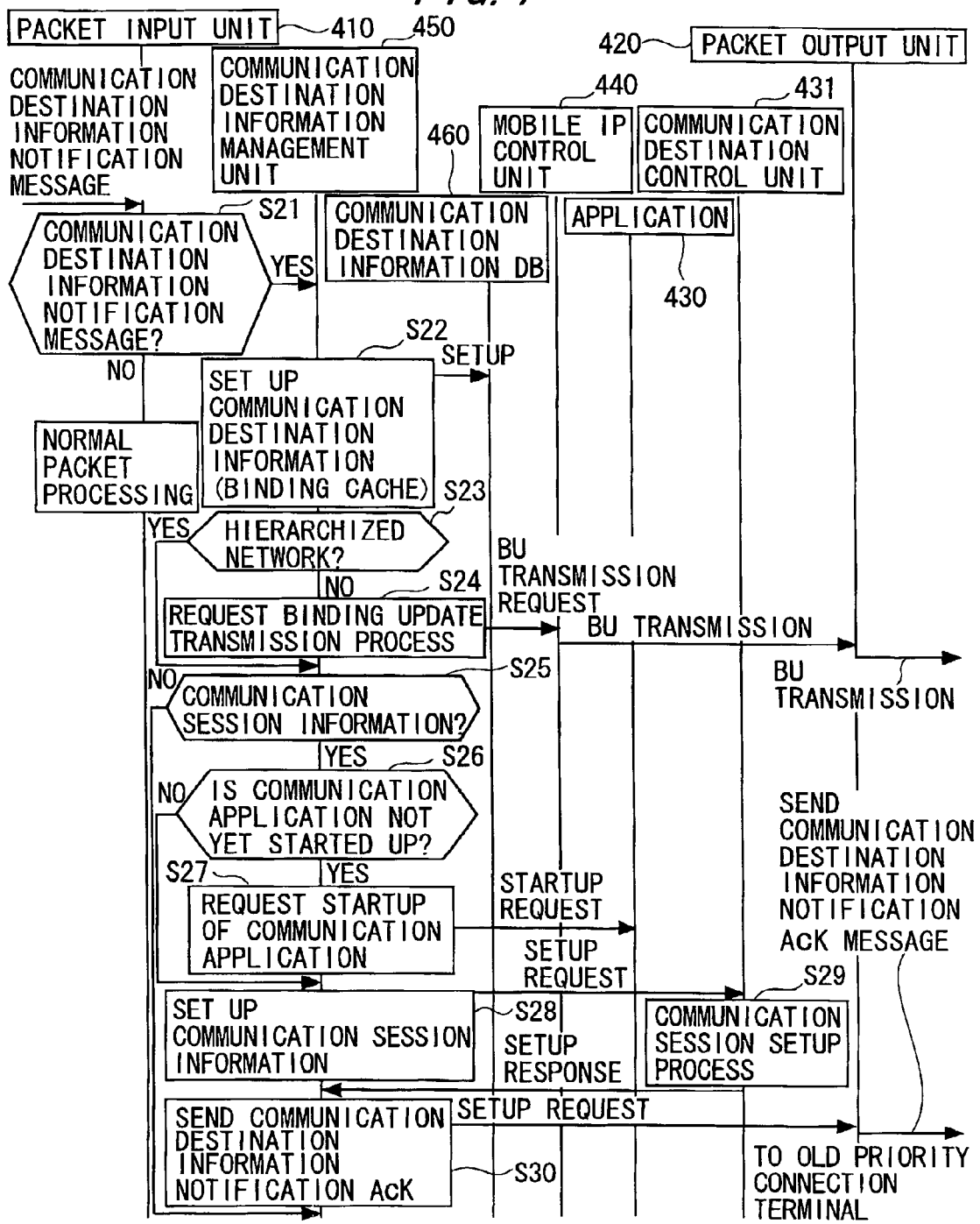
FIG. 7 is a diagram showing a processing sequence of receiving a communication destination information notification message.

FIG. 5 is a diagram showing a processing sequence on the home agent. FIG. 6 is a diagram showing a processing sequence on the user terminal receiving the priority-based connection switchover notification message. FIG. 7 is a diagram showing a processing sequence on the user terminal receiving the communication destination information notification message.

To begin with, the PDA 401 is connected to the foreign network 30 via the wireless LAN, wherein the care-of-address of the PDA 401 at this time is CoA 30-1. In this example, this PDA 401 is defined as the predetermined user terminal, and the home agent 500 previously stores the storage device with information (an interface ID) such as a MAC (Media Access Control) address and a computer name that specify the predetermined user terminal (PDA 401). The home agent 500, when given the notification (BU) of the care-of-address from this predetermined user terminal, transfers the packet addressed to the home network to a proper terminal among the user terminals connected to the same subnetwork as the predetermined user terminal exists. Namely, if the user owns the plurality of user terminals 400 such as the PC 403 and the fixed IP telephone 402 and if the PDA 401 moves to and connects to the different subnetwork even when these user terminals 400 are kept connecting to the subnetworks, the home agent 500 judges that the user has moved to the location of this subnetwork.

The home agent 500 in the first embodiment determines the terminal to be preferentially connected from within the plurality of terminals owned by the user on the basis of the user terminal information management data (the location information of the PDA is, however, before the user moves, unlike FIG. 10, "Area-30" representing the foreign network 30, and the care-of-address is CoA 30-1) shown in FIG. 10. Then, the home agent 500 stores, as shown in FIG. 9, the MN information DB with the care-of-address CoA of the preferentially-connected terminal in away that associates CoA with the home-of-address HoA as the MN information management data, and forwards the packet addressed to the home-of-address HoA to the destination of the care-of-address CoA.

In the system shown in FIG. 3, if the PDA 401 is located in the foreign network 30, the PDA 401 is managed as the top priority terminal. In this status, the PDA 401 accesses the correspondent node 300 defined as a streaming server and starts receiving distribution of a streaming video, in which case the correspondent node 300 transmits the packets of the streaming video to the destination of the home-of-address HoA. The packets addressed to the home-of-address HoA are routed to the home network 10 where the home agent 500 managing the user terminals 400 exists and, after being encapsulated with the care-of-address CoA 30-1 associated with the home-of-address HoA by the home agent 500, reach the PDA 401. It is to be noted that the home-of-address HoA is set on the user-by-user basis in the first embodiment. Accordingly, each of the user terminals 401, 402, 403 utilizes the same home-of-address HoA.

Next, a processing sequence in such a case that the user moves while the PDA 401 moves from the foreign network 30 to an area of the foreign network 20, will hereinafter be explained with reference to FIGS. 5 and 6.

The PDA 401, when moving to the area of the foreign network 20, receives via the packet input unit 410 a RA message periodically reported from a router (unillustrated) within the foreign network 20 through a wireless access point. Then, the PDA 401 detects the movement due to a difference from the RA message received so far in the foreign network 30 and generates a care-of-address CoA 20-1. Thereafter, the PDA 401 sends the BU message for registering the location to the home agent 500.

In response to this message, the home agent 500 receiving the BU message via the packet input unit 510 judges, as shown in FIG. 5, whether the message is the mobile IP control packet or not (S1), and, if being the mobile IP control packet, hands over the processing to the MN control unit 530.

The MN control unit 530 judges whether the message is the BU message or not (S2) and, if being the BU message, executes a BU receiving process (S3) and a BA transmitting process of BA (Binding Acknowledgment) defined as a response message to BU (S4). Thereafter the MN control unit 530 hands over the processing to the user data management unit 532.

The user data management unit 532 executes a connection priority level judging process by referring to the MN information DB 550 shown in FIG. 10. (S5).

As a result of the priority level judgment, the care-of-address CoA of the terminal exhibiting the highest priority level in the subnetwork where the PDA 401 exists, is associated with the home-of-address HoA (address mapping) and is thus stored on the MN information DB. For instance, if the PDA 401 has the highest priority level, the care-of-address CoA 20-1 in this foreign network 20 is associated with the home-of-address HoA. As shown in FIG. 10, if the desktop type PC 403 has the highest priority level, the care-of-address CoA 20-3 of the desktop type PC 403 is associated with the home-of-address HoA, thus switching over the priority-based connection terminal (S6).

Thereafter, when the priority-based connection terminal is switched over, for informing the PDA 401 as the old priority-based connection terminal that the priority-based connection terminal has been switched over, a priority-based connection switchover notification message containing the CoA information (CoA 20-3) of the new priority-based connection terminal as an additional piece of information, is sent (to the PDA 401) (S7, S8).

Then, a processing sequence of the PDA 401 receiving the priority-based connection switchover notification message, will be described with reference to FIG. 6. Incidentally, an assumption is that the PDA 401 will have booted the communication application (S11) and will have started the communication session with the correspondent node CN before receiving the priority-based connection switchover notification message as described above. Herein, the communication destination control unit 431, as triggered by the start of the communication of the application, notifies the communication destination information management unit 450 of the communication session information. The communication destination information management unit 450 receiving the notification stores the communication destination information DB 460 with various categories of information (S12).

When receiving the priority-based connection switchover notification message via the packet input unit 410, the processing is handed over the communication destination information management unit 450 (S13) The communication destination information management unit 450 acquires the communication destination information (Binding Cache) and the communication session information of the application by referring to the communication destination information DB 460, and sends the communication destination information notification message via the packet output unit 420 to the care-of-address CoA (CoA 20-3) of the desktop type PC 403 defined as the new priority-based connection MN, which care-of-address is attached to the priority-based connection switchover notification (S14).

Next, a processing sequence of the new priority-based connection MN (the desktop type PC 403) receiving the communication destination information notification message, will be explained with reference to FIG. 7.

The desktop type PC 403, when receiving the communication destination information notification message via the packet input unit 410, hands over the processing to the communication destination information management unit 450 (S21). The communication destination information management unit 450 registers the received communication destination information (Binding Cache) on the communication destination information DB 460 (S22). If the now-connecting network is not a hierarchized network and there is the communication destination information, the route optimization is carried out, and the correspondent node 300 manages, as the connection destination address, the care-of-address CoA 30-1 of the PDA 401 that was the old priority-based connection MN. Therefore, the communication destination information management unit 450 makes a BU transmission request for notifying the mobile IP control unit 440 of a change of the address (S23, S24).

The mobile IP control unit 440 sends the BU message to the correspondent node 300 via the packet output unit 420.

Moreover, if the communication session information is attached to the communication destination information notification message, the communication destination information management unit 450 checks a boot status of the target communication application, and requests the application execution unit 430 and the communication destination control unit 431 to restore the communication session (S25-S28). The communication destination control unit 431 restores the communications on the basis of the communication session information (such as a TCP (Transmission Control Protocol) port number, a sequence number and application unique information) (S29).

Upon completion of restoring the session, the communication destination information management unit 450 sends an Ack message in response to the communication destination information notification to the PDA 401 defined as the old priority-based connection MN (S30).

Further, the PDA 401 receiving the communication destination information notification Ack message deletes the self-managed communication destination information (Binding Cache) and communication session information (S15, S16).

The series of processes described above enable the desktop type PC 403 under the foreign network 20 to enjoy the distribution of the streaming video started by the PDA 401 under the foreign network 30.

Next, a user operation of explicitly switching over the priority-based connection terminal will be described with reference to FIGS. 3 and 8.

When desiring to switch over the communication session from the now-using terminal 400 to a different terminal 400, a priority-based connection switchover request message containing an interface ID and a care-of-address of the want-to-switch-over terminal as pieces of switchover destination information, is sent to the home agent 500 by use of GUI (Graphic User Interface), commands, etc.

The home agent 500 changes, based on the switchover destination information, the care-of-address CoA associated with the home-of-address HoA in the MN information management data on the MN information DB 550 into a requested care-of-address CoA. Thereafter, the home agent 500 changes the user terminal information management data on the MN information DB managed by the user data management unit 532, and transmits the priority-based connection switchover notification to the user terminal that was the old priority-based connection terminal. The operation of the user terminal receiving the priority-based connection switchover notification is the same as in the description from FIG. 6 onward, and therefore its explanation is omitted.

Thus, the user and the client program sends the priority-based connection switchover request message to the home agent 500, whereby the priority-based connection destination terminal can explicitly switched over.

It should be noted that in the first embodiment, the care-of-address determination unit, i.e., the user data management unit acquires the care-of-address of the user terminal exhibiting the highest priority level as the care-of-address of the priority-based connection MN (the proper user terminal) in a way that refers to the priority level storage module, however, the care-of-address acquisition method is not limited to this method. The care-of-address acquisition method may also be such that the storage unit (the storage device) is stored with a history of the user terminals employed for the communications, wherein there is acquired the care-of-address of the user terminal used for the communications when the predetermined user terminal connects to the subnetwork; and the storage unit (the storage device) is stored with usage frequencies of the user terminals, wherein there is also acquired the care-of-address of the user terminal exhibiting the highest usage frequency when the predetermined user terminal connects to the subnetwork. Namely, the care-of-address determination unit is arbitrarily pre-stored with the determination condition of the proper terminal, wherein the care-of-address of the user terminal satisfying this predetermined condition among the user terminals connecting to the subnetwork to which the predetermined user terminal moves, may also be acquired.

Second Embodiment

Figure 13:
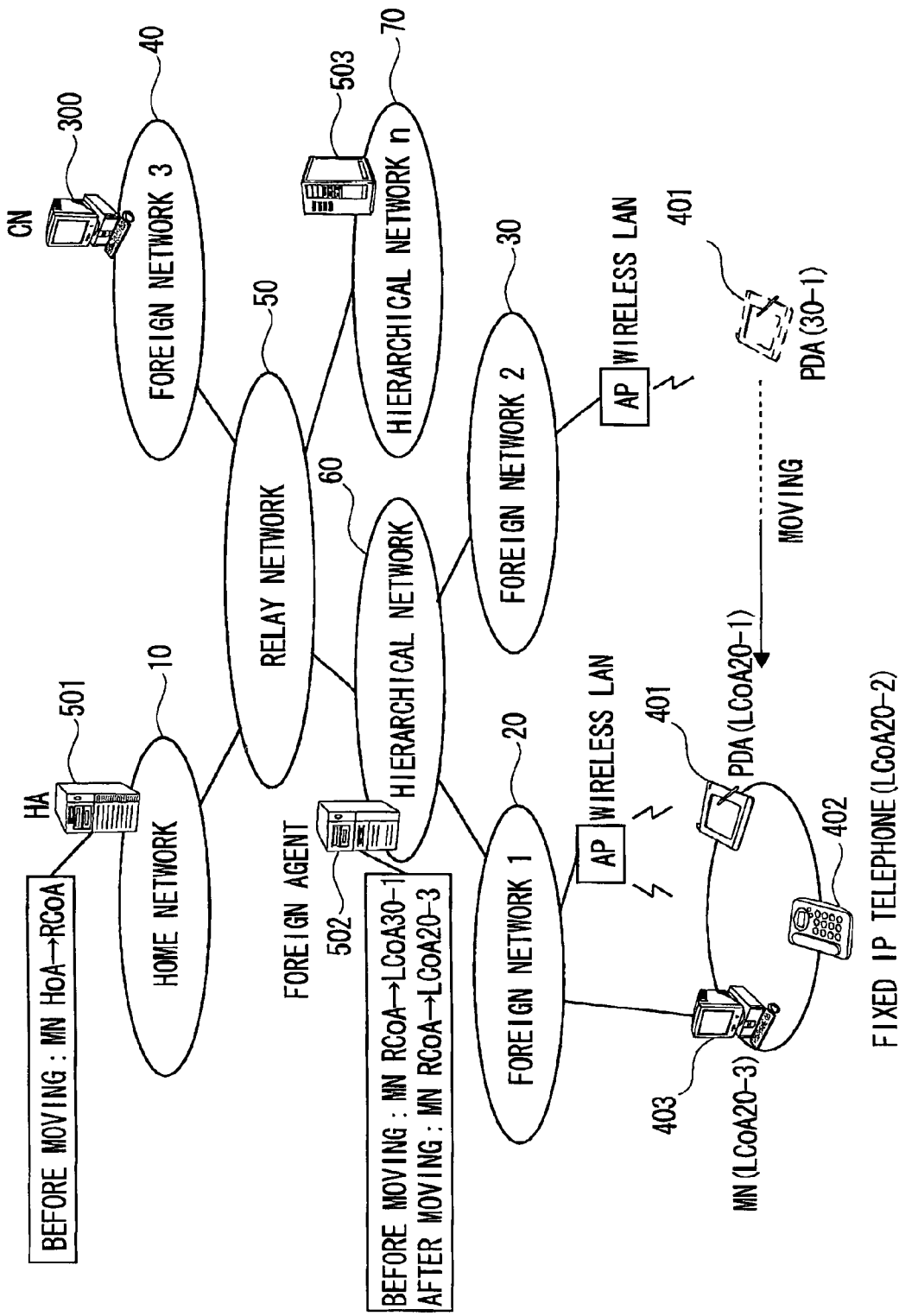
FIG. 13 is a view of a system architecture in a second embodiment according to the present invention.

FIG. 13 is a view showing a system architecture of a second embodiment according to the present invention. The second embodiment is different from the first embodiment discussed above in terms of providing a foreign network for managing the hierarchized subnetworks, and other configurations are substantially the same. Therefore, the same components as those in the first embodiment are marked with the same numerals and symbols, and their repetitive explanations are partially omitted.

In the second embodiment, each of foreign agents 502, 503 has the same configuration as the home agent 500 shown in FIG. 3 has, and a different point is that the care-of-address CoA of each user terminal 400, which is managed on the MN information DB, is associated with a regional address RCoA.

Further, a home agent 501 in the second embodiment has the same configuration as that of the home agent 500 illustrated in FIG. 3, and a different point is that as a substitute for the care-of-address CoA of each user terminal 400, which is managed on the MN information DB, the regional address RCoA of the foreign agent managing the user terminal is so managed as to be associated with the home-of-address HoA.

Namely, when the mobile node MN is located within the hierarchical network, the foreign agents 502, 503 perform a role corresponding to the home agent 500 when non-hierarchized. Accordingly, within the hierarchical network, the regional address RCoA managed by the foreign agent corresponds to the home-of-address HoA, and the care-of-address CoA assigned to the MN within the hierarchical network corresponds to the care-of-address CoA when non-hierarchized.

Next, a communication control procedure (method) according to the second embodiment will hereinafter be described with reference to FIGS. 14 through 16.

Figure 14:
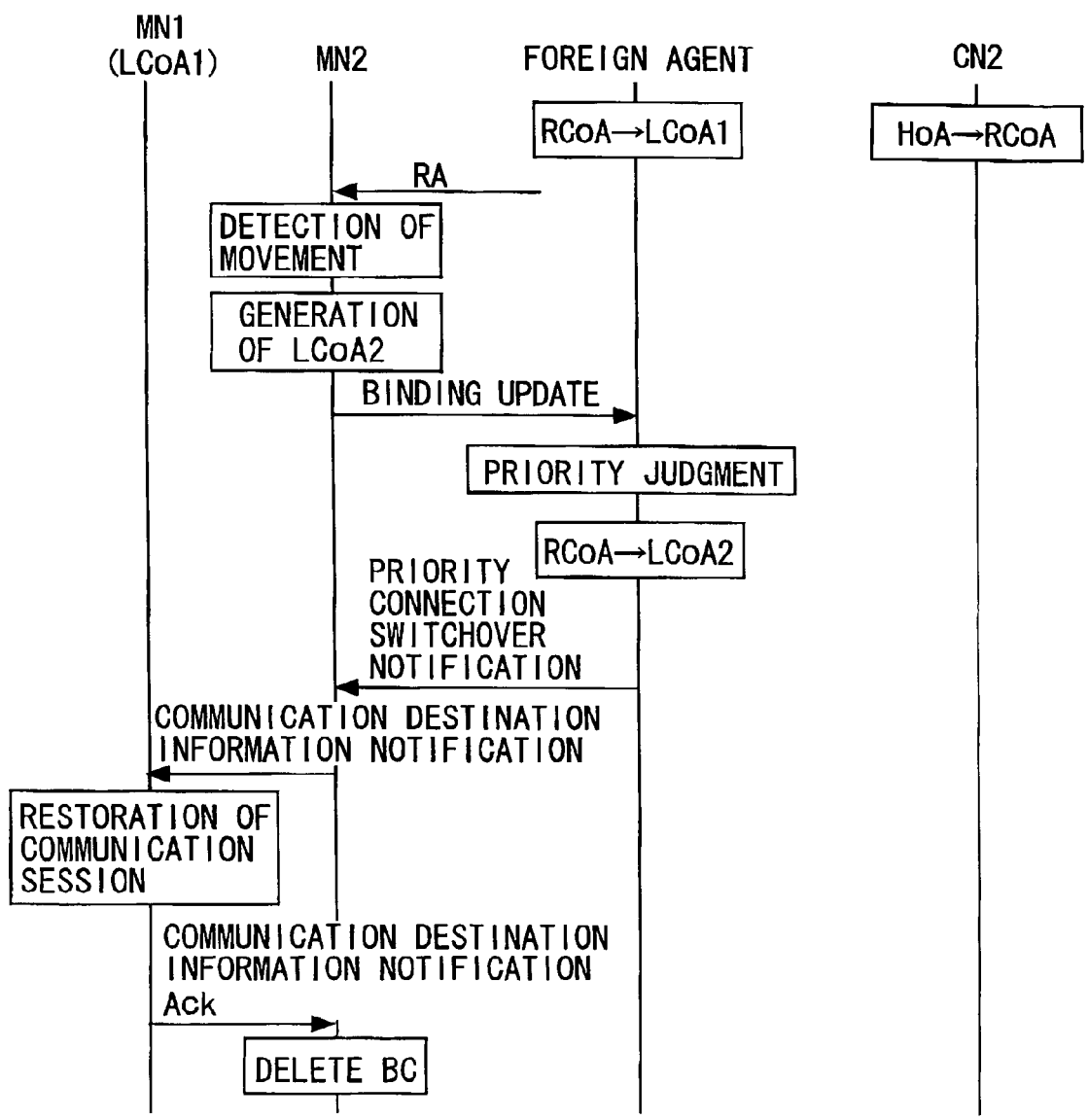
FIG. 14 is a diagram showing a processing sequence between the nodes in the second embodiment.
Figure 17:
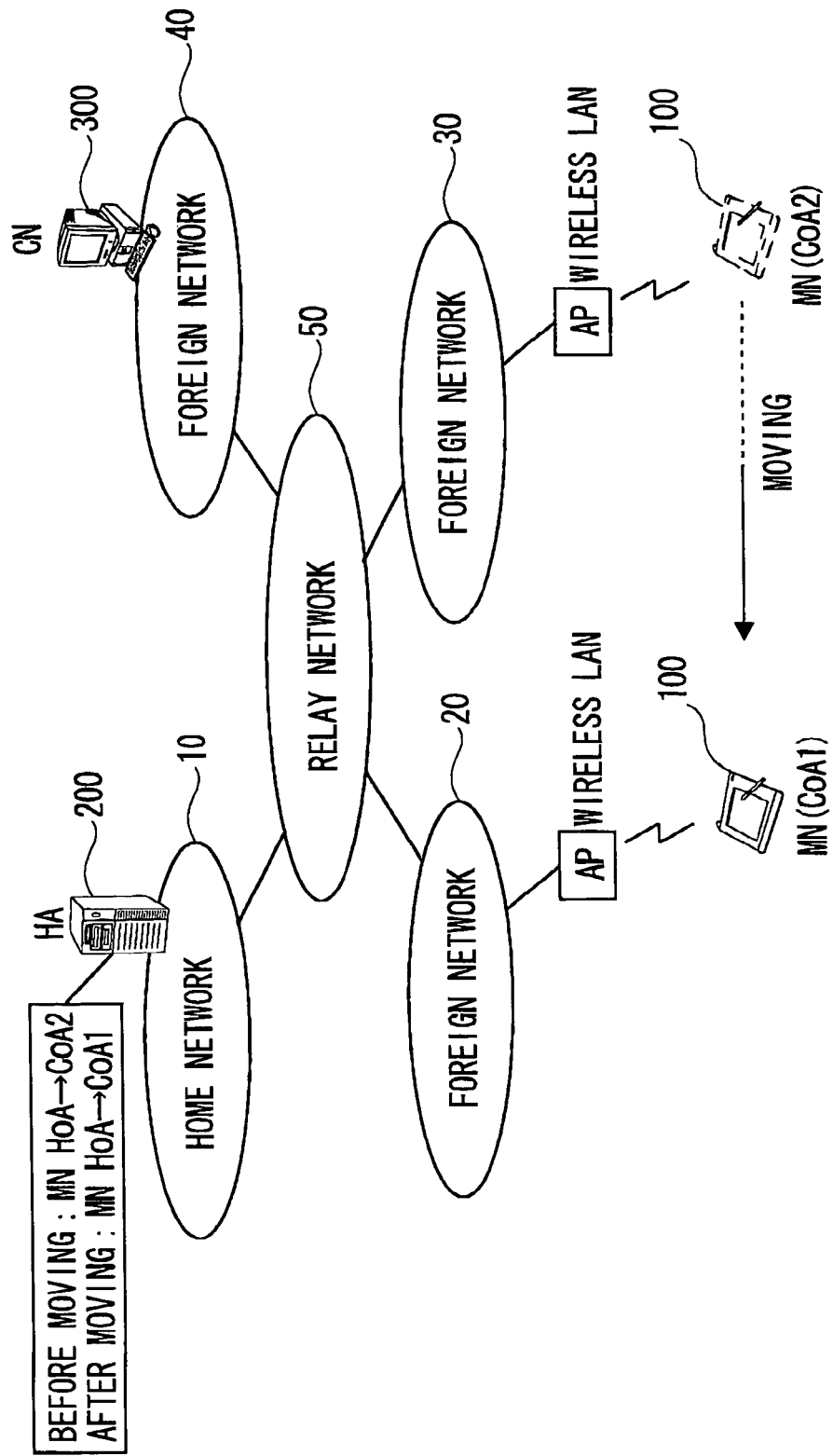
FIG. 17 is a view of a system architecture in the prior art.
Figure 18:
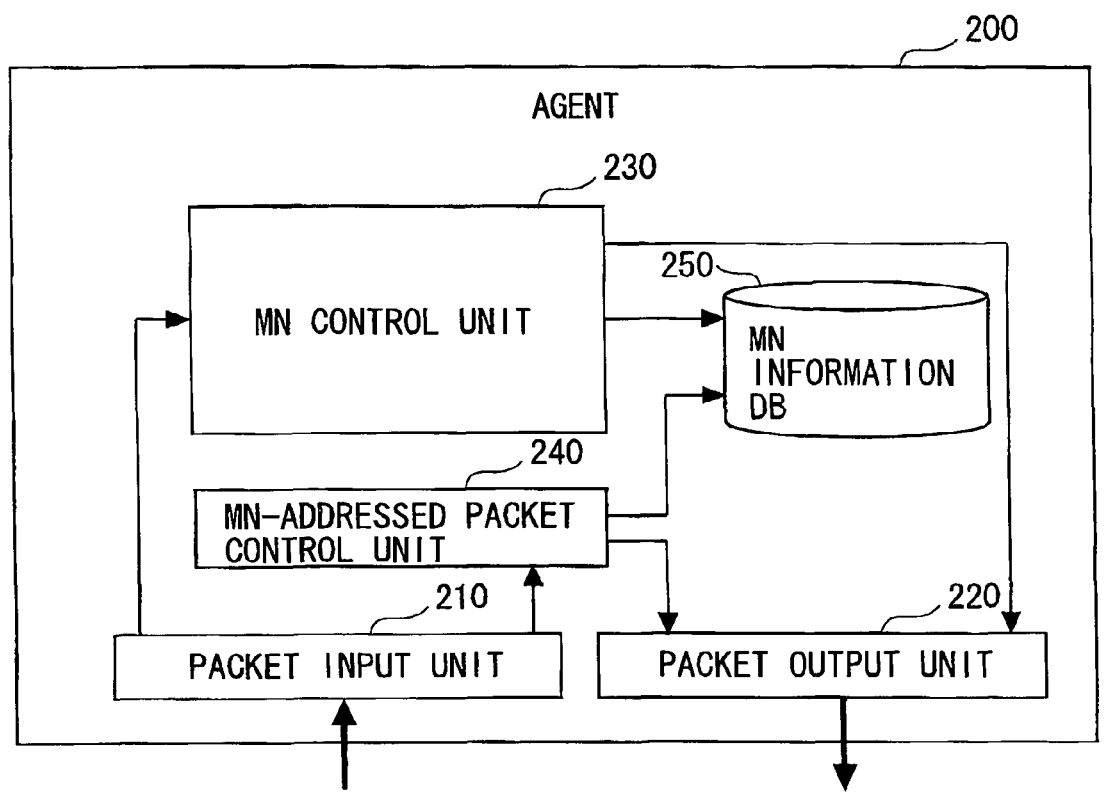
FIG. 18 is a schematic block diagram of a home agent in the prior art.
Figure 19:
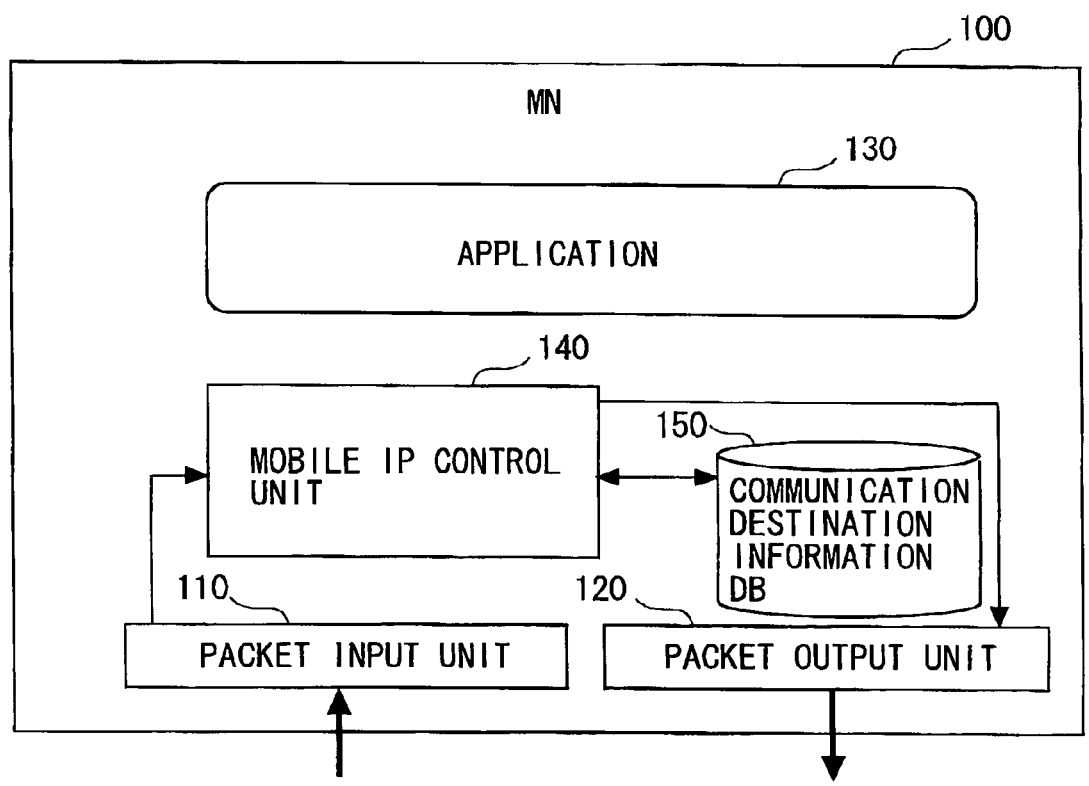
FIG. 19 is a schematic block diagram of a user terminal in the prior art.

FIG. 14 is a diagram showing a sequence between the nodes. FIG. 14 illustrates an example, wherein the PDA 401 serving as the predetermined user terminal performing the communications with the correspondent node 300 in the foreign network 30 with in a hierarchical network 60 moves to the foreign network 20 during the communications.

To begin with, the PDA 401, when having moved to the fore network 20 from the foreign network 30 within the hierarchical network 60 managed by the foreign agent 502, receives an RA message from the new foreign network 20. The PDA 401 receiving the RA message detects the movement from a change in RA detection information, and generates a care-of-address LCoA 20-2. Thereafter, the PDA 401 sends the BU message to the foreign agent 502.

The foreign agent 502 receiving the BU message judges a connection priority order (priority level) of the user terminal 401 in the terminal-moved foreign network 20. If a terminal exhibiting a higher priority level than the user terminal 401 exists in the terminal-moved foreign network 20, the foreign agent 502 switches over the care-of-address associated with the regional address RCoA. In this example, the foreign agent 502 effects the switchover to a care-of-address CoA 20-3 of the desktop type PC 403.

Thereafter, the foreign agent 502 sends, to the PDA 401 (LCoA 20-1) that was an old priority-based connection MN, a priority-based connection switchover notification message showing that the priority-based connection node has been switched over to a different node.

The PDA 401 receiving the priority-based connection switchover notification message sends the communication destination information (Binding Cache) and the communication session information to the desktop type PC 403 set afresh as the priority-based connection MN. Thereafter, the PDA 401 deletes the communication destination information (Binding Cache) and the communication session information of the self-node after receiving an Ack message in response to the communication destination information notification, and finishes the communications of the application.

Further, the desktop type PC 403 set afresh as the priority-based connection MN receives the communication destination information notification and the communication session information, and restores the communication session based on the communication destination information notification and the communication session information. Then, the desktop type PC 403 sends the communication destination information notification Ack to the PDA 401 (LCoA 20-1) that was the old priority-based connection MN.

From what has been described above, when the foreign agent 502 manages the plurality of terminals 400 employed by the user, the terminal 400 different from the terminal 401 that has been used so far becomes usable (in the description given above, the user moves, and the PC 403 and the fixed IP telephone 402 existing in the same area become usable), which triggers the switchover of the priority-based connection MN and the transfer of the communication session information, whereby the communication session can be seamlessly switched over to the proper terminal 403 without causing any troublesome operation of the user.

Note that when the predetermined user terminal 401 moves to a network managed by a different foreign agent, the home agent 501 or the correspondent node 300 is notified of the BU message. For example, when moving to a hierarchical network 70 from the hierarchical network 60, the PDA 401 notifies the home agent 501 of a regional address RCoA 70 of the foreign agent 503 managing the terminal-moved network 70. The home agent 501 stores this regional address RCoA in a way that associates RCoA with the home-of-address HoA. With this address mapping, the packet transmitted by the correspondent node 300 to the home-of-address HoA is forwarded by the home agent 501 to the foreign agent 503 in the foreign network 70, and the foreign agent 503 further forwards the packet to the care-of-address LCoA (LCoA 70-1) of the PDA 401, whereby the packet reaches the PDA 401. Hereat, for optimizing the communication route, such a configuration may be taken that the PDA 401 notifies the correspondent node 300 of the regional address RCoA 70 in the moving destination, and the packet is transmitted to the foreign agent from the correspondent node 300.

Moreover, as described above, when the predetermined user terminal (PDA 401) moves to the different hierarchical network and sends the BU message to the foreign agent 503, the foreign agent 503 may send the BU message to the home agent 501 or the correspondent node 300.

Next, a detailed explanation of this communication control will be given including the processes in the respective nodes.

To begin with, the PDA 401 is connected to the foreign network 30 via the wireless LAN, wherein the care-of-address CoA of the PDA 401 at this time is set to LCoA 30-1. Herein, the foreign agents 502, 503 according to the present invention determine one terminal to be preferentially connected from within the plurality of user terminals 400 on the basis of the user terminal information management data shown in FIG. 15. Then, the foreign agents 502, 503 store, as shown in FIG. 16, the MN information DB with the regional address RCoA and the care-of-address LCoA of the preferentially-connected terminal in a way that associates RCoA and LCoA with each other as the MN information management data.

In the system shown in FIG. 13, if the PDA 401 is located in the foreign network 30, the foreign agent 502 sets the PDA 401 as the top priority terminal, and makes such management that the regional address RCoA 60 is associated with the care-of-address LCoA 30-1 of the PDA 401. In this status, the PDA 401 accesses the correspondent node 300 defined as a streaming server and starts receiving distribution of a streaming video, in which case the packets from the correspondent node 300 are forwarded once to the home-of-address HoA. The packets addressed to the home-of-address HoA are routed to the home network where the PDA 401 exists and, after being encapsulated with the regional address RCoA by the home agent 501, reach the foreign agent 502.

The foreign agent 502 judges based on the regional address RCoA that the packets are addressed to the user terminal managed by the foreign agent 502 itself, and the packets are encapsulated with the care-of-address LCoA 30-1 associated with the regional address RCoA and thus reach the PDA 401. It is to be noted that the regional address RCoA is set on the user-by-user basis in this example. Accordingly, the user terminals 401, 402 and 403 employ the same regional address RCoA.

Given next is an explanation of a processing sequence in a case where the PDA 401 moves to an area under the foreign network 20 from under the foreign network 30.

The PDA 401, when moving to under the foreign network 20, receives a RA message periodically reported from a router (unillustrated) within the foreign network 20. Then, the PDA 401 detects the movement from a change of this RA message and generates a care-of-address LCoA 20-1 in the foreign network 20. Thereafter, the PDA 401 sends the BU message for registering the location to the foreign agent 502.

Then, the foreign agent 502, after receiving the BU message, in the same way as the processing sequence of the home agent shown in FIG. 5, judges, after receiving the BU message via the packet input unit 510, that the packet is the mobile IP control packet, and hands over the processing to the MN control unit 530 (S1). The MN control unit 530, if the message is the BU message, executes a BU receiving process and a BA transmitting process (S2-S4), and thereafter hands over the processing the user data management unit 532.

The user data management unit 532 sets various categories of information in the user terminal information management data on the MN information DB 550 shown in FIG. 15, and executes a connection priority level judging process (S5).

As a result of the priority level judgment, the care-of-address LCoA associated with the regional address RCoA is updated to an optimal terminal address (S6). The example of the second embodiment is that the setting is changed from the care-of-address LCoA 30-1 of the PDA 401 defined as the old priority-based connection MN to the care-of-address LCoA 20-3 of the desktop type PC 403 defined as the new priority-based connection MN.

Thereafter, the user data management unit 532, for notifying the PDA 401 defined as the old priority-based connection MN that the priority-based connection terminal has been switched over, sends the priority-based connection switchover notification message attached with the LCoA information (LCoA 20-3) of the new priority-based connection MN as an additional piece of information.

Further, a processing sequence of the PDA 401 receiving the priority-based connection switchover notification message will be explained. Note that the processing sequence of the PDA 401 hereat is substantially the same as in FIG. 6. An assumption is that the PDA 401 will have booted the communication application and will have started the communication session with the correspondent node CN before receiving the priority-based connection switchover notification message.

Herein, the communication destination control unit 431, as triggered by the start of the communications of the application (S11), sets the communication session information in the communication destination information management unit 450.

Then, the communication destination control unit 431, upon receiving the priority-based connection switchover notification message via the packet input unit 410, hands over the processing to the communication destination information management unit 450 (S13).

The communication destination information management unit 450 acquires the communication destination information (Binding Cache) and the communication session information of the application by referring to the communication destination information DB 460, and sends the communication destination information notification message via the packet output unit 420 to the care-of-address LCoA (LCoA 20-3), attached to the priority-based connection switchover notification message, of the desktop type PC 403 defined as the new priority-based connection MN (S14).

Next, a processing sequence of the new priority-based connection MN (the desktop type PC 403) receiving the communication destination information notification message, will be described with reference to FIG. 14.

The desktop type PC 403, when receiving the communication destination information notification message via the packet input unit 410, hands over the processing to the communication destination information management unit 450 (S21). The communication destination information management unit 450 registers the received communication destination information (Binding Cache) in the communication destination information DB (S22). In this example, the connecting network is the hierarchized network, and hence, even when the route is optimized, the communication destination address managed by the correspondent node 300 is RCoA and remains unchanged, thereby performing none of the BU transmission (S23-S24).

Then, when the communication session information is attached to the communication destination information notification message, the communication destination information management unit 450 checks a boot statue of the target communication application, and requests the application execution unit 430 and the communication destination control unit 431 to restore the communication session (S25-S28). The communication destination control unit 431 restores the communications on the basis of the communication session information (such as a TCP port number, a sequence number and application unique information) (S29).

Upon completion of restoration, the communication destination information management unit 450 sends an Ack message in response to the communication destination information notification to the PDA 401 defined as the old priority-based connection MN (S30).

The series of processes described above, even when the network has the hierarchized structure, enable the new priority-based connection MN (the desktop type PC 403) under the foreign network 20 to enjoy the distribution of the streaming video started by the predetermined user terminal (PDA 401) under the foreign network 30

Thus, according to the second embodiment discussed above, in the mobile IP network environment, when there exists a plurality of terminals possessed by the user, the connection to the network can be switched over seamlessly while continuing the communications between the terminals, corresponding to the state of the user.

Utilization, which can be considered, is exemplified such as switching over, to the PC, the session of a streaming broadcast watched on the PDA when the PC becomes usable if existing somewhere other than a user's place (a self-seat) at the office, and automatically switching over the session to the PC having a TV phone function when returning to the self-seat while talking with a communication partner by an IP mobile phone. Note that these types of control can be automatically actualized under automatically preset conditions without the user's making the reconnection, the transfer and changing the setting.

Moreover, the CDMA 2000 (Code Division Multiple Access 2000) system for the third generation mobile communications adopts the mobile IP as a method used for the mobile device to access the foreign IP network by utilizing the packet service. In the case of applying the present invention to the home agent HA in the CDMA2000, when the mobile device enters the area enabling the use of the low-cost and high-speed network such as the wireless LAN and the fixed network, the present invention can be utilized such as switching over the connection to another terminal.

As discussed above, according to the present invention, when the predetermined user terminal connects, as the user moves, to the subnetwork to which the user terminal moves, the communications can continue (seamless communications) on the proper user terminal even when the user moves between the different subnetworks by forwarding the information from the correspondent node to the proper user terminal among the user terminals connected to the subnetwork.

What is claimed is:

1. A communication control system, including:

a plurality of user terminals connected via a network built up by a plurality of subnetworks; and a home agent to manage care-of-addresses of the plurality of user terminals, each of the care-of-addresses to be used as a connection destination of a correspondent node in each of the plurality of subnetworks connected to the plurality of user terminals;

the plurality of user terminals including a mobile user terminal to connect, as a user of the mobile user terminal moves, to any one of the plurality of subnetworks to which the mobile user terminal is connectable, the mobile user terminal comprising:

an address acquisition module to acquire a care-of-address when the mobile user terminal connects to any one of the plurality of subnetworks, and an address control module to send update information containing the care-of-address to the home agent, the home agent comprising:

a user data storage module stored with care-of-addresses of user terminals usable by a user of the mobile user terminal among the plurality of user terminals, the care-of-addresses being associated with a home-of-address assigned to the user of the mobile user terminal;

a priority level storage module stored with priority level information of the user terminals usable by the user of the mobile user terminal;

a care-of-address determination module to obtain a subnetwork to which the mobile user terminal is connected on the basis of the update information received from the mobile user terminal, and to acquire a care-of-address of a taking-over user terminal as a post-switchover care-of-address, which is associated with the same home-of-address as the care-of-address of the mobile user terminal and to which information transmitted to the home-of-address are transferred, by referring to the priority level storage module, the taking-over user terminal being any one of the user terminals usable by the user of the mobile user terminal among user terminals that are connected to the obtained subnetwork and exhibiting a higher priority level than that of the mobile user terminal;

a communication control module transferring information transmitted to the home-of-address to the post-switchover care-of-address acquired by the care-of-address determination module; and a user data management module to notify, when having switched over the user terminal to which the information transmitted to the home-of-address are transferred, the mobile user terminal of a switchover information including the post-switchover care-of-address to which the information transmitted to the home-of-address are transferred, the mobile user terminal further comprising a communication destination information transfer module to transfer, when receiving the switchover information, communication destination information including session information of a session carried out between the correspondent node and the mobile user terminal to the taking-over user terminal becoming a new connection destination of the correspondent node, the user terminal as the taking-over user terminal comprising:

an address change notification module to send a connection destination address change notification to the correspondent node on the basis of the communication destination information; and a communication destination information management module to take over the session carried out between the correspondent node and the mobile user terminal on the basis of the communication destination information, and to carry out the session with the correspondent node.

2. A communication control system, including:

a plurality of user terminals connected via a network built up by a plurality of subnetworks including at least some hierarchized subnetworks; a foreign agent to manage care-of-addresses of the plurality of user terminals connected to the hierarchized subnetworks; and a home agent managing the care-of-addresses of the plurality of user terminals and an address of the foreign agent, each of the care-of-address to be used as a connection destination of a correspondent node in each of the plurality of subnetworks connected to the plurality of user terminals;

the plurality of user terminals including a mobile user terminal to connect, as a user of the mobile user terminal moves, to any one of the plurality of subnetworks to which the mobile user terminal is connectable, the mobile user terminal comprising:

an address acquisition module to acquire a care-of-address when the mobile user terminal connects to any one of the plurality of subnetworks, and an address control module to send update information containing the care-of-address to the foreign agent, the foreign agent comprising:

a region user data storage module stored with care-of-addresses of user terminals usable by a user of the mobile user terminal among the plurality of user terminals, the care-of-addresses being associated with a regional address assigned to the user of the mobile user terminal;

a priority level storage module stored with priority level information of the user terminals usable by a user of the mobile user terminal among the plurality of user terminals;

a care-of-address determination module to obtain a subnetwork to which the mobile user terminal is connected on the basis of the update information received from the mobile user terminal, and to acquire a care-of-address of a taking-over user terminal as a post-switchover care-of-address, which is associated with the same regional address as the care-of-address of the mobile user terminal and to which information transmitted to the regional address are transferred, by referring to the priority level storage module, the taking-over user terminal being any one of the user terminals usable by the user of the mobile user terminal among user terminals that are connected to the obtained subnetwork and exhibiting a higher priority level than that of the mobile user terminal;

a communication control module to transfer information transmitted to the regional address to the post-switchover care-of-address acquired by the care-of-address determination module;

a user data management module to notify, when having switched over the user terminal to which the information transmitted to the regional address are transferred, the mobile user terminal of a switchover information including the post-switchover care-of-address to which the information transmitted to the regional address are transferred, an address control module to transmit the update information containing the regional address to the home agent, the home agent comprising:

a home user data storage module stored with a regional address in a way that associates the regional address with a home-of-address; and a communication control module to forward information transmitted to the home-of-address to the regional address by referring to the home user data storage module, the mobile user terminal further comprising a communication destination information transfer module to transfer, when receiving the switchover information, communication destination information including session information of a session carried out between the correspondent node and the mobile user terminal to the taking-over user terminal becoming a new connection destination of the correspondent node, the user terminal as the taking-over user terminal comprising:

an address change notification module to send a connection destination address change notification to the correspondent node on the basis of the communication destination information; and a communication destination information management module to take over the session carried out between the correspondent node and the mobile user terminal on the basis of the communication destination information, and to carry out the session with the correspondent node.

3. The communication control system according to claim 1, wherein the home agent includes a switchover control module switching over any one of the user terminals to which the information transmitted to the home-of-address are transferred when receiving a switchover request from the user terminal, and the communication control module forwards the information addressed to the home-of-address to the post-switchover care-of-address.

4. The communication control system according to claim 2, wherein the foreign agent includes a switchover control module switching over any one of the user terminals to which the information transmitted to the redional address are transferred when receiving a switchover request from the user terminal, and the communication control module forwards the information addressed to the regional address to the post-switchover care-of-address.

5. A communication control method executed in a communication control system, comprising:

a plurality of user terminals connected via a network built up by a plurality of subnetworks; and a home agent to manage care-of-addresses of the plurality of user terminals, each of the care-of-addresses to be used as a connection destination of a correspondent node in each of the plurality of subnetworks connected to the plurality of user terminals;

the plurality of user terminals including a mobile user terminal to connect, as a user of the mobile user terminal moves, to any one of the plurality of subnetworks to which the mobile user terminal is connectable, the mobile user terminal executing:

acquiring a care-of-address when the mobile user terminal connects to any one of the plurality of subnetworks, and sending update information containing the care-of-address to a home agent, the home agent executing:

obtaining a subnetwork to which a mobile user terminal is connected on the basis of the update information;

acquiring a care-of-address of a taking-over user terminal as a post-switchover care-of-address, which is associated with a same home-of-address assigned to a user of the mobile user terminal as the care-of-address of the mobile user terminal and to which information transmitted to the home-of-address are transferred by referring to a priority level storage module stored with priority level information of user terminals usable by the user of the mobile user terminal among the plurality of user terminals and a user data storage module stored with care-of-addresses of the user terminals usable by the user of the mobile user terminal among the plurality of user terminals, the taking-over user terminal being any one of the user terminals usable by the user of the mobile user terminal among user terminals that are connected to the obtained subnetwork and exhibiting a higher priority level than that of the mobile user terminal; and transferring information transmitted to the home-of-address to the post-switchover care-of-address acquired in the acquiring the care-of-address;

notifying, when having switched over the user terminal to which the information transmitted to the home-of-address are transferred, the mobile user terminal of a switchover information including the post-switchover care-of-address to which the information transmitted to the home-of-address are transferred, the mobile user terminal further transferring, when receiving the switchover information, communication destination information including session information of a session carried out between the correspondent node and the mobile user terminal to the taking-over user terminal becoming a new connection destination of the correspondent node, the user terminal as the taking-over user terminal executing:

sending a connection destination address change notification to the correspondent node on the basis of the communication destination information; and taking over the session carried out between the correspondent node and the mobile user terminal on the basis of the communication destination information, and carrying out the session with the correspondent node.

6. A communication control method executed in a communication control system, comprising:

a plurality of user terminals connected via a network built up by a plurality of subnetworks including at least some hierarchized subnetworks; a foreign agent to manage care-of-addresses of the plurality of user terminals connected to the hierarchized subnetworks; and a home agent to manage the care-of-addresses of the plurality of user terminals and an address of the foreign agent, each of the care-of-addresses to be used as a connection destination of a correspondent node in each of the plurality of subnetwork connected to the plurality of user terminals;

the user terminals including a mobile user terminal to connect, as a user of the mobile user terminal moves, to any one of the plurality of subnetworks to which the mobile user terminal is connectable, in the method, the mobile user terminal executing:

acquiring a care-of-address when the mobile user terminal connects to any one of the plurality of subnetworks, and sending update information containing the care-of-address to the foreign agent, in the method, the foreign agent executing:

obtaining a subnetwork to which a mobile user terminal is connected on the basis of the update information received from the mobile user terminal;

acquiring a care-of-address of a taking-over user terminal as a post-switchover care-of-address, which is associated with a same regional address assigned to a user of the mobile user terminal as the care-of-address of the mobile user terminal and to which information transmitted to the regional address are transferred, by referring to a priority level storage module stored with priority level information of user terminals usable by the user of the mobile user terminal among the plurality of user terminals and a region user data storage module stored with care-of-addresses of the user terminals usable by the user of the mobile user terminal among the plurality of user terminals, the taking-over user terminal being any one of the user terminals usable by the user of the mobile user terminal among user terminals that are connected to the obtained subnetwork and exhibiting a higher priority level than that of the mobile user terminal;

transferring information transmitted to the regional address to the post-switchover care-of-address acquired in the acquiring the care-of-address;

transmitting the update information containing the regional address to the home agent and notifying, when having switched over the user terminal to which the information transmitted to the home-of-address are transferred, the mobile user terminal of a switchover information including the post-switchover care-of-address to which the information transmitted to the home-of-address are transferred, in the method, the home agent executing:

forwarding information transmitted to the home-of-address to the regional address by referring to a home user data storage module stored with the regional address in a way that associates the regional address with the home-of-address, the mobile user terminal further transferring, when receiving the switchover information, communication destination information including session information of a session carried out between the correspondent node and the mobile user terminal to the taking-over user terminal becoming a new connection destination of the correspondent node, the user terminal as the taking-over user terminal executing:

sending a connection destination address change notification to the correspondent node on the basis of the communication destination information; and taking over the session carried out between the correspondent node and the mobile user terminal on the basis of the communication destination information, and carrying out the session with the correspondent node.

7. A mobile user terminal being one of a plurality of user terminals included in a communication control system, including:

the plurality of user terminals connected via a network built up by a plurality of subnetworks; and a home agent to manage care-of-addresses of the plurality of user terminals, each of the care-of-addresses to be used as a connection destination of a correspondent node in each of the subnetworks connected to the plurality of user terminal;

wherein the home agent comprises:

a user data storage module stored with care-of-addresses of user terminals usable by a user of a mobile user terminal among the plurality of user terminals, the care-of-addresses being associated with a home-of-address assigned to the user of the mobile user terminal;

a care-of-address determination module to obtain a subnetwork to which the mobile user terminal is connected on the basis of update information received from the mobile user terminal, and to acquire a care-of-address of a taking-over user terminal as a post-switchover care-of-address, which is associated with the same home-of-address as the care-of-address of the mobile user terminal and to which information transmitted to the home-of-address are transferred, by referring to a priority level storage module, the taking-over user terminal being any one of the user terminals usable by the user of the mobile user terminal among user terminals that are connected to the obtained subnetwork and exhibiting a higher priority level than that of the mobile user terminal; and a user data management module notifying, when having switched over the user terminal to which the information transmitted to the home-of-address are transferred, the mobile user terminal of a switchover information including the post-switchover care-of-address to which the information transmitted to the home-of-address are transferred, the mobile user terminal comprising:

connecting module to connect, as a user of the mobile user terminal moves, to any one of the plurality of subnetworks to which the mobile user terminal is connectable;

an address acquisition module to acquire a care-of-address when the mobile user terminal connects to any one of the plurality of subnetworks, an address control module to send the update information containing the care-of-address to the home agent; and a communication destination information transfer module to transfer, when receiving switchover information that a care-of-address of the connection destination of the correspondent node has been switched over sent from the home agent, communication destination information including session information of a session carried out between the correspondent node and the mobile user terminal to a taking-over user terminal becoming a new connection destination.

8. A non-transitory computer readable medium storing executable instructions executed by a computer, the computer being one of a plurality of user terminals included in a communication control, system including:

the plurality of user terminals connected via a network built up by a plurality of subnetworks; and a home agent to manage care-of-addresses of the plurality of user terminals, each of the care-of-addresses to be used as a connection destination of a correspondent node in each of the plurality of subnetworks connected to the plurality of user terminals;

wherein the home agent comprises:

a user data storage module stored with care-of-addresses of user terminals usable by a user of a mobile user terminal among the plurality of user terminals, the care-of-addresses being associated with a home-of-address assigned to the user of the mobile user terminal; and a care-of-address determination module to obtain a subnetwork to which the mobile user terminal is connected on the basis of update information receiving from the mobile user terminal, and to acquire a care-of-address of a taking-over user terminal as a post-switchover care-of-address, which is associated with the same home-of-address as the care-of-address of the mobile user terminal and to which information transmitted to the home-of-address are transferred, by referring to a priority level storage module, the taking-over user terminal being any one of the user terminals usable by the user of the mobile user terminal among user terminals that are connected to the obtained subnetwork and exhibiting a higher priority level than that of the mobile user terminal; and a user data management module notifying, when having switched over the user terminal to which the information transmitted to the home-of-address are transferred, the mobile user terminal of a switchover information including information of the post-switchover care-of-address to which the information transmitted to the home-of-address are transferred, the executable instructions, when executed, cause the computer to perform:

connecting, as a user of the mobile user terminal moves, to any one of the plurality of subnetworks to which the mobile user terminal is connectable;

acquiring a care-of-address when the mobile user terminal connects to any one of the plurality of subnetworks;

sending the update information containing the care-of-address to the home agent; and transferring, when having switched over the user terminal to which the information transmitted to the home-of-address are transferred and receiving switchover information, including information of the post-switchover care-of-address to which the information transmitted to the home-of-address are transferred, sent from the home agent, communication destination information including session information of a session carried out between the correspondent node and the mobile user terminal to the taking-over user terminal becoming a new connection destination.

* * * * *